(12) United States Patent
Li et al.

(10) Patent No.: US 12,225,221 B2
(45) Date of Patent: Feb. 11, 2025

(54) ULTRA LIGHT MODELS AND DECISION FUSION FOR FAST VIDEO CODING

(71) Applicant: Google LLC, Mountain View, CA (US)

(72) Inventors: Shan Li, Fremont, CA (US); Claudionor Coelho, Redwood City, CA (US); In Suk Chong, Mountain View, CA (US); Aki Kuusela, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 244 days.

(21) Appl. No.: 17/779,380

(22) PCT Filed: Dec. 23, 2019

(86) PCT No.: PCT/US2019/068279
§ 371 (c)(1),
(2) Date: May 24, 2022

(87) PCT Pub. No.: WO2021/107965
PCT Pub. Date: Jun. 3, 2021

(65) Prior Publication Data
US 2023/0007284 A1    Jan. 5, 2023

Related U.S. Application Data

(60) Provisional application No. 62/940,272, filed on Nov. 26, 2019.

(51) Int. Cl.
*H04N 19/107*     (2014.01)
*H04N 19/11*      (2014.01)
(Continued)

(52) U.S. Cl.
CPC .......... *H04N 19/436* (2014.11); *H04N 19/11* (2014.11); *H04N 19/124* (2014.11);
(Continued)

(58) Field of Classification Search
CPC .... H04N 19/436; H04N 19/11; H04N 19/124; H04N 19/149; H04N 19/159; H04N 19/176; H04N 19/593
See application file for complete search history.

(56) References Cited

U.S. PATENT DOCUMENTS 10,499,081 B1 * 12/2019 Wang ...................... G06N 3/084
10,848,765 B2 * 11/2020 Joshi ..................... H04L 65/762
(Continued)

FOREIGN PATENT DOCUMENTS

CN           109842799 A      6/2019

OTHER PUBLICATIONS

Yuan et al. "Edge Information Based Effective Intra Mode Decision Algorithm", 2012 IEEE.*
(Continued)

*Primary Examiner* — James T Boylan
(74) *Attorney, Agent, or Firm* — Young Basile Hanlon & MacFarlane, P.C.

(57) ABSTRACT

Ultra light models and decision fusion for increasing the speed of intra-prediction are described. Using a machine-learning (ML) model, an ML intra-prediction mode is obtained. A most-probable intra-prediction mode is obtained from amongst available intra-prediction modes for encoding the current block. As an encoding intra-prediction mode, one of the ML intra-prediction mode or the most-probable intra-prediction mode is selected, and the encoding intra-prediction mode is encoded in a compressed bitstream. A current block is encoded using the encoding intra-prediction mode. Selection of the encoding intra-prediction mode is based on relative reliabilities of the ML intra-prediction mode and the most-probable intra-prediction mode.

19 Claims, 15 Drawing Sheets

(51) Int. Cl.
 *H04N 19/124* (2014.01)
 *H04N 19/149* (2014.01)
 *H04N 19/159* (2014.01)
 *H04N 19/176* (2014.01)
 *H04N 19/436* (2014.01)
 *H04N 19/593* (2014.01)

(52) U.S. Cl.
 CPC ......... *H04N 19/149* (2014.11); *H04N 19/159* (2014.11); *H04N 19/176* (2014.11); *H04N 19/593* (2014.11)

(56) References Cited

U.S. PATENT DOCUMENTS

| | | |
|---|---|---|
| 2008/0205515 A1 | 8/2008 | Kalva et al. |
| 2012/0082220 A1* | 4/2012 | Mazurenko ............ H04N 19/11 375/E7.243 |
| 2016/0014421 A1 | 1/2016 | Cote et al. |
| 2018/0184123 A1* | 6/2018 | Terada ................... G06T 9/002 |
| 2018/0227585 A1* | 8/2018 | Wang ................... H04N 19/136 |
| 2019/0045195 A1 | 2/2019 | Gokhale et al. |
| 2019/0075301 A1* | 3/2019 | Chou ..................... G06N 3/045 |
| 2020/0092552 A1* | 3/2020 | Coelho ............... H04N 19/147 |
| 2020/0186808 A1* | 6/2020 | Joshi ................... H04N 19/159 |
| 2020/0186809 A1* | 6/2020 | Mukherjee .......... H04N 19/176 |
| 2020/0236349 A1* | 7/2020 | Zhai ....................... H04N 19/61 |
| 2020/0252654 A1* | 8/2020 | Su ....................... H04N 19/176 |
| 2020/0280717 A1* | 9/2020 | Li ............................. G06N 3/08 |
| 2021/0014531 A1* | 1/2021 | Pfaff .................... H04N 19/593 |
| 2021/0103793 A1* | 4/2021 | Huang ................... G06N 3/045 |
| 2021/0214558 A1* | 7/2021 | Choi ................... C09B 23/0008 |
| 2021/0218997 A1* | 7/2021 | Rezazadegan Tavakoli ................ H04N 19/176 |
| 2021/0235085 A1* | 7/2021 | Chen ..................... H04N 19/30 |
| 2022/0007045 A1* | 1/2022 | Yang ..................... G06V 20/40 |
| 2022/0141455 A1* | 5/2022 | Cricri .................. H04N 19/593 375/240.02 |
| 2022/0201316 A1* | 6/2022 | Coelho .................. H04N 19/96 |
| 2022/0295116 A1* | 9/2022 | Ma ....................... H04N 19/117 |
| 2022/0351422 A1* | 11/2022 | Li ........................ H04N 19/102 |
| 2022/0377342 A1* | 11/2022 | Santamaria Gomez ..................... H04N 19/46 |
| 2022/0398455 A1* | 12/2022 | Dumas ................. H04N 19/105 |
| 2023/0393960 A1* | 12/2023 | Yadagiri ................ G06N 20/00 |

OTHER PUBLICATIONS

International Search Report and Written Opinion of International Application No. PCT/US2019/068279 dated Nov. 27, 2020, 27 pgs.
Fanyi Duanmu et al., "Fast Mode and Partition Decision Using Machine Learning for Intra-Frame Coding in HEVC Screen Content Coding Extension", IEEE Journal of Emerging and Selected Topics in Circuits and Systems, IEEE, Piscataway, NJ, USA, vol. 6, No. 4, Dec. 2016, pp. 517-531.
J. Pfaff et al., "Neural network based intra prediction for video coding", Proceedings of SPIE, vol. 10752, Sep. 17, 2018, p. 1075213-1 to 1075213-7.
R. Jillianu et al., "Low Complexity Intra MB Encoding in AVC/H. 264", IEEE Transactions on Consumer Electronics, IEEE Service Center, New York, NY, US, vol. 55 , No. 1, Feb. 1, 2009, pp. 277-285.
Junaid Tariq et al., "Adaptive stopping strategies for fast intra mode decision in HEVC", Journal of Visual Communication and Image Representation, Academic Press, Inc., US, vol. 51, Dec. 20, 2017, pp. 1-13.
Thorsten Laude et al., "Deep learning-based intra prediction mode decision for HEVC", 2016 Picture Coding Symposium (PCS), IEEE, Dec. 4, 2016, 5 pgs.
Yule Yuan et al., "Edge information based effective intra mode decision algorithm", 2012 IEEE International Conference on Signal Processing, Communication and Computing (ICSPCC), Aug. 12, 2012, pp. 628-633.
Linwei Zhu et al., "Binary and Multi-Class Learning Based Low Complexity Optimization for HEVC Encoding", IEEE Transactions on Broadcasting, vol. 63, No. 3, Sep. 2017, pp. 547-561.

* cited by examiner

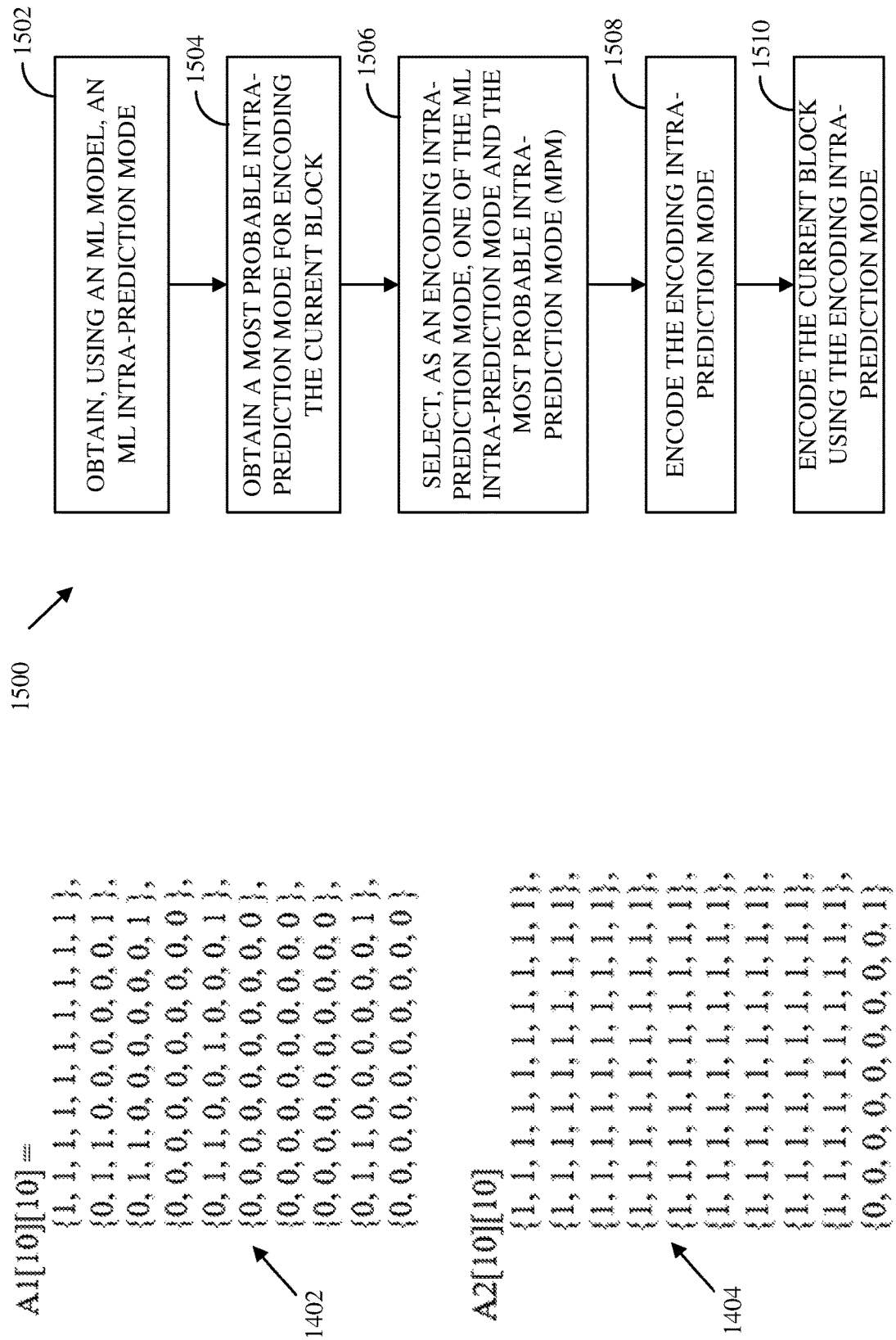

ULTRA LIGHT MODELS AND DECISION FUSION FOR FAST VIDEO CODING

CROSS-REFERENCE TO RELATED APPLICATION(S)

This application claims priority to and the benefit of U.S. Provisional Patent Application Ser. No. 62/940,272, filed Nov. 26, 2019, the entire disclosure of which is hereby incorporated by reference.

BACKGROUND

Digital video streams may represent video using a sequence of frames or still images. Digital video can be used for various applications, including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Over the years, the coding efficiency of video encoders has improved. Coding efficiency can mean encoding a video at the lowest possible bit rate while minimizing distortion (i.e., while maintaining a certain level of video quality). However, the improved coding efficiency has resulted in increased computational complexity. That is, more computation time is required by an encoder to achieve the improved coding efficiency. As such, it is desirable to obtain improved coding efficiencies with less computation time (i.e., reduced computational complexity).

SUMMARY

One aspect of the disclosed implementations is a method for encoding a current block of video using intra-prediction. The method includes obtaining, using a machine-learning (ML) model, an ML intra-prediction mode; obtaining a most-probable intra-prediction mode from amongst available intra-prediction modes for encoding the current block; selecting, as an encoding intra-prediction mode, one of the ML intra-prediction mode or the most-probable intra-prediction mode; encoding, in a compressed bitstream, the encoding intra-prediction mode; and encoding the current block using the encoding intra-prediction mode. The selecting is based on relative reliabilities of the ML intra-prediction mode and the most-probable intra-prediction mode.

Another aspect is a method for encoding a current block of video using intra-prediction. The method includes obtaining pre-calculated features; obtaining, using a machine-learning (ML) model, an ML intra-prediction mode, where the ML model receives the pre-calculated features as inputs; selecting an encoding intra-prediction mode using at least the ML intra-prediction mode; encoding, in a compressed bitstream, the encoding intra-prediction mode; and encoding the current block using the encoding intra-prediction mode. The pre-calculated features can include at least two of a first feature, the first feature being a non-linear function of a quantization parameter; second features, the second features being respective errors between the current block and respective prediction blocks, wherein each prediction block corresponds to an available intra-prediction mode; a mean and a variance of the current block; and a sum-of-absolute values of a convolution block, the convolution block obtained from the current block.

Another aspect is an apparatus for encoding a current block of video using intra-prediction. The apparatus obtains, using a machine-learning (ML) model, ML intra-prediction modes; obtains most-probable intra-prediction modes from amongst available intra-prediction modes for encoding the current block; selects, as an encoding intra-prediction mode, one of the ML intra-prediction mode or one of the most-probable intra-prediction modes; encodes, in a compressed bitstream, the encoding intra-prediction mode; and encodes the current block using the encoding intra-prediction mode.

Another aspect is an apparatus for encoding a current block of video using intra-prediction. The apparatus obtains pre-calculated features; obtains, using a machine-learning (ML) model, an ML intra-prediction mode, where the ML model receives the pre-calculated features as inputs; selects an encoding intra-prediction mode using at least the ML intra-prediction mode; encodes, in a compressed bitstream, the encoding intra-prediction mode; and encodes the current block using the encoding intra-prediction mode. The pre-calculated features can include at least two of a first feature, which is a non-linear function of a quantization parameter; second features, which are respective errors between the current block and respective prediction blocks, where each prediction block corresponds to an available intra-prediction mode; a mean and a variance of the current block; and a sum-of-absolute values of a convolution block, the convolution block obtained from the current block.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings, wherein like reference numerals refer to like parts throughout the several views.

FIG. 14 illustrates examples of decision matrices according to implementations of this disclosure.

FIG. 15 is a flowchart of a process for encoding a current block using intra-prediction according to implementations of this disclosure.

DETAILED DESCRIPTION

Figure 1:
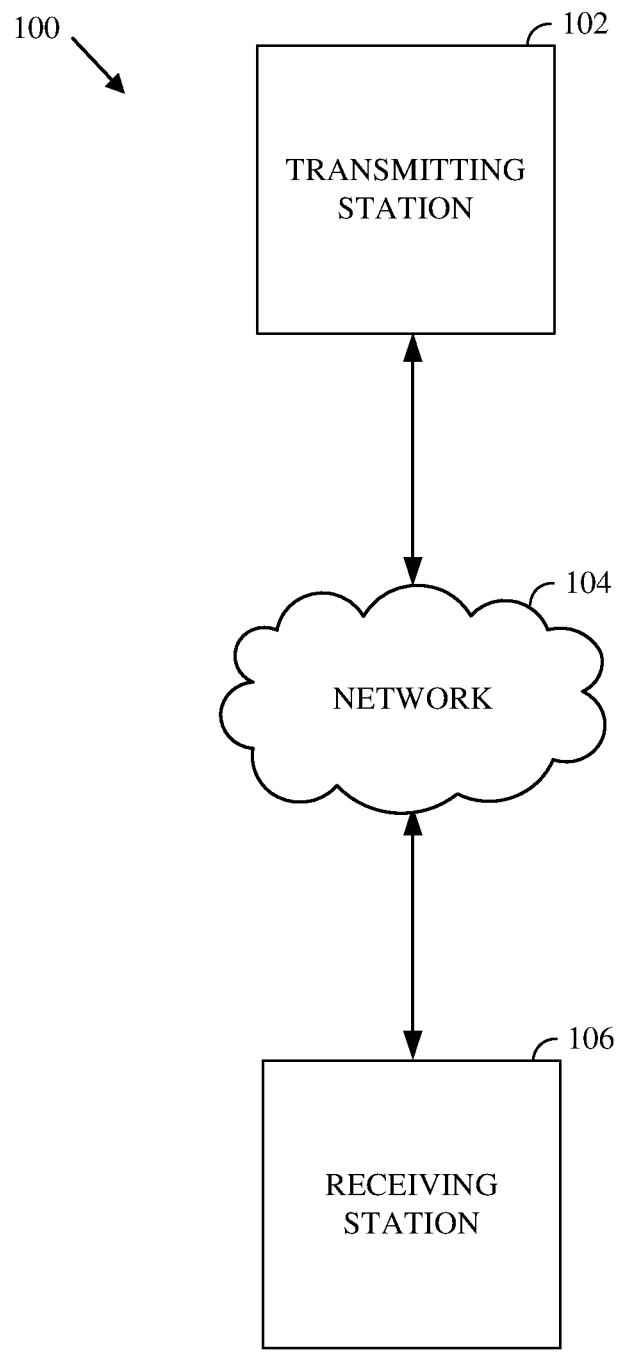
FIG. 1 is a schematic of a video encoding and decoding system.

Modern video codecs (e.g., H.264, which is also known as MPEG-4 Part 10; VP9; H.265, which is also known as High Efficiency Video Coding (HEVC); the Audio Video Coding Standard; and AOMedia Video 1 (AV1)) define and use many tools and configurations to improve coding efficiency. Coding efficiency is typically measured in terms of both rate and distortion. Rate refers to the number of bits required for encoding (such as encoding a block, a frame, etc.). Distortion measures the quality loss between, for example, a source video block and a reconstructed version of source video block. By performing a rate-distortion optimization (RDO) process, a video codec optimizes the amount of distortion against the rate required to encode the video.

To determine an optimal combination of tools and configurations (e.g., parameters) to be used, a video encoder can use a mode decision process. The mode decision process can examine (e.g., test, evaluate, etc.) at least some of the valid combinations of tools. In an example, all possible combinations are examined. Examining all possible combinations, or a subset thereof, is referred to herein as a brute-force approach.

The brute-force approach for mode decision can compute the rate-distortion cost of all possible combinations (or a subset thereof) and can then choose the one with the best cost for each basic processing block. Different codecs use different nomenclature to refer to the basic processing block. The basic processing block may be referred to as a super-block (i.e., in AV1), as a macroblock (i.e., in HEVC), and so on. The brute-force approach can be, especially if all combinations are tested, extremely computationally intensive. As the number of possible tools and parameters increases, the number of combinations also increases, which, in turn, increases the time required to determine the best mode. For example, the AV1 codec includes roughly 160 additional tools over the VP9 codec, thereby resulting in a significant increase in search time for the best mode.

Assume that a first combination of parameters results in a first rate (e.g., rate=100) and a first distortion (e.g., distortion=90) and that a second combination of parameters results in a second rate (e.g., rate=120) and a second distortion (e.g., distortion=80). A procedure (e.g., a technique, etc.) is required to evaluate which of the first combination and the second combination is the better combination of parameters. To evaluate whether one combination is better than another, a metric can be computed for each of the examined combinations and the respective metrics compared. In an example, the metric can combine the rate and distortion to produce one single scalar value, as described below. In this disclosure, the rate-distortion cost is used as such a scalar value.

An example of a mode decision process is an intra-prediction mode decision process, which determines the best intra-prediction mode for coding a coding block.

To encode a basic processing block (which may be of size 64×64, 128×128, or some other size), an encoder may attempt to determine (e.g., extract, select, etc.) a hierarchical representation (i.e., a partitioning) of the basic processing block all the way to 4×4 blocks, with the options of not splitting the block. The possible partitions (of the basic processing block or any square sub-block) may include not partitioning the block, using vertical or horizontal splits, using square or rectangular splits, or a combination thereof.

Encoding a video stream, or a portion thereof, such as a frame or a block, can include using temporal or spatial similarities in the video stream to improve coding efficiency. For example, a current block of a video stream may be encoded based on identifying a difference (residual) between the previously coded pixel values, or between a combination of previously coded pixel values, and those in the current block.

Encoding using temporal similarities can be known as inter prediction. Inter prediction attempts to predict the pixel values of a block using a possibly displaced block or blocks from a temporally nearby frame (i.e., reference frame) or frames.

Encoding using spatial similarities can be known as intra prediction. Intra prediction attempts to predict the pixel values of a block of a frame of video using pixels peripheral to the block. The pixels peripheral to the block can include top pixels, which are pixels above the block; left pixels, which are pixels to the left of the block; and/or one or more top-left pixels. That is, the peripheral pixels are pixels that are in the same frame as the block but that are outside of the block. The mechanism of how the edge (i.e., the peripheral) pixels are used to generate the prediction is referred to as the intra prediction mode.

In the HEVC encoder, for example, 35 intra-prediction modes are possible for luminance blocks that are larger than or equal to 4×4. The VP9 encoder uses ten intra-prediction modes. The AV1 encoder can be said to include 58 intra-prediction modes (two non-directional modes plus eight main directional angles with three, positive and negative, offset delta angles from each of the main angles). Each of the intra-prediction modes dictates how a respective prediction block is determined. The mode decision process, in this context, may determine a respective prediction block for each of the intra-prediction modes and select the intra-prediction mode corresponding to the smallest rate-distortion cost. Said another way, the mode decision process selects the intra-prediction mode that provides the best rate-distortion performance. Examples of intra-prediction modes are provided with respect to FIG. 7.

As mentioned above, the best intra-prediction mode (or simply, a best mode) can be selected from many possible combinations.

Accordingly, techniques, such as machine learning, may be exploited to reduce the time required to determine the best intra-prediction mode. Machine learning can be well suited to address the computational complexity problem in video coding. The brute-force, on-the-fly mode decision process that is typically performed by an encoder can be replaced with a trained machine-learning (ML) model, which can infer an intra-prediction mode decision for encoding a current block. A well-trained ML model can be expected to closely match the brute-force approach in coding efficiency but at a significantly lower computational cost or with a regular or dataflow-oriented computational cost.

A vast amount of training data can be generated, for example, by using the brute-force approaches to mode decision (e.g., intra-prediction mode decision). That is, the training data can be obtained by an encoder performing standard encoding techniques, such as those described with respect to FIGS. 4, 8, and 9.

The training data can be used, during the learning phase of machine learning, to derive (e.g., learn, infer, etc.) a machine-learning (ML) model that is (e.g., defines, constitutes, etc.) a mapping from the input data to an output that constitutes a mode decision, such as the intra-prediction mode to be used for encoding a current block. Accordingly, the ML model can be used to replace the brute-force, computation heavy encoding processes (such as those described with respect to FIGS. 4, 8, and 9), thereby reducing the computation complexity in mode decision.

The predictive capabilities (i.e., accuracy) of an ML model are as good as the inputs used to train the machine-learning model and the inputs presented to the machine-learning model to predict a result (e.g., the best mode). As such, when machine learning is used for video encoding, it is critical that the correct set of inputs and the correct (e.g., appropriate, optimal, etc.) forms of such inputs are used. Once an ML model is trained, the model computes the output as a deterministic function of its input(s). As such, it can be critical to have the right architecture for an ML model.

An efficient ML model architecture designed for video coding is described herein. In an example, the machine-learning model can be a neural-network model. In an example, the neural-network model can be ultra-light (i.e., contains a relatively small number of parameters and/or operations) and includes only dense operations (i.e., fully connected layers). In another example, the neural-network model can include convolutional layers, yet it is still relatively ultra-light.

The well-known universal approximation theorem of information theory states that a feed-forward neural network can be used to approximate any continuous function on a compact subset of the n-dimensional real coordinate space $R^n$. It is noted that the intrinsic linear nature of existing neural networks implies that a smaller network or shorter learning time may be achieved if a neural network is tasked (i.e., trained) to approximate (e.g., map, solve, infer) a linear function (e.g., mapping) than a non-linear function. It is also noted that the mapping of video blocks to mode decisions can be characterized as a continuous function.

The universal approximation theorem does not characterize feasibility or time and space complexity of the learning phase. That is, while a neural network may be theoretically capable of approximating the non-linear function, an unreasonably large (e.g., in terms of the number of nodes and/or layers) network and/or an unreasonably long training time may be required for the neural network to learn to approximate, using linear functions, the non-linear function. For practical purposes, the unreasonable size and time required may render the learning, the inference, or both infeasible.

As mentioned, a well-trained neural network model can be expected to closely match the brute-force approach in coding efficiency. However, for many resource-constrained encoding platforms (e.g., mobile devices such as cell phones, online video streaming, etc.), codec hardware area size and encoding speed can be of great concern.

As such, a small model (i.e., one with a small set of parameters and few inference operations) may be preferred over large models. However, a small model may not have the same accuracy as a deep (or large) model.

To boost, or supplement, the potential lower inference accuracy of small ML models, implementations according to this disclosure can combine (i.e., fuse) the ML model with heuristics that may be used in video codecs in best mode selections (e.g., intra-prediction mode selection) to maintain the encoding efficiency and significantly lower computational cost. Using the right features (as input to the ML model) and choosing the right fusion strategy of the ML model output with heuristics (e.g., codec heuristics for choosing an intra-prediction mode) can be of utmost importance to achieve a compact deep learning/machine learning model that can attempt to analyze intra prediction modes during the encoding process.

A small ML model size can make it possible to perform inferring on a power/capacity-constrained mobile platform. A small ML model size according to implementations of this disclosure can be obtained by 1) pre-calculating a set of directional features as input and including existing feature(s) from the codec, such as mean and variance of the block, quantization parameter (QP) and sum of absolute differences SAD-based mode cost as part of the model input; and 2) merging the ML prediction with SAD-based mode decision to optimize mode accuracy.

Ultra-light models and decision fusion for fast video coding is described herein first with reference to a system in which the teachings may be incorporated.

It is noted that details of machine learning, neural networks, and/or details that are known to a person skilled in the art are omitted herein. For example, a skilled person in the art recognizes that the values of the weights of connections between nodes (i.e., neurons) in a neural network are determined during the training phase. Accordingly, such are not discussed in detail herein.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
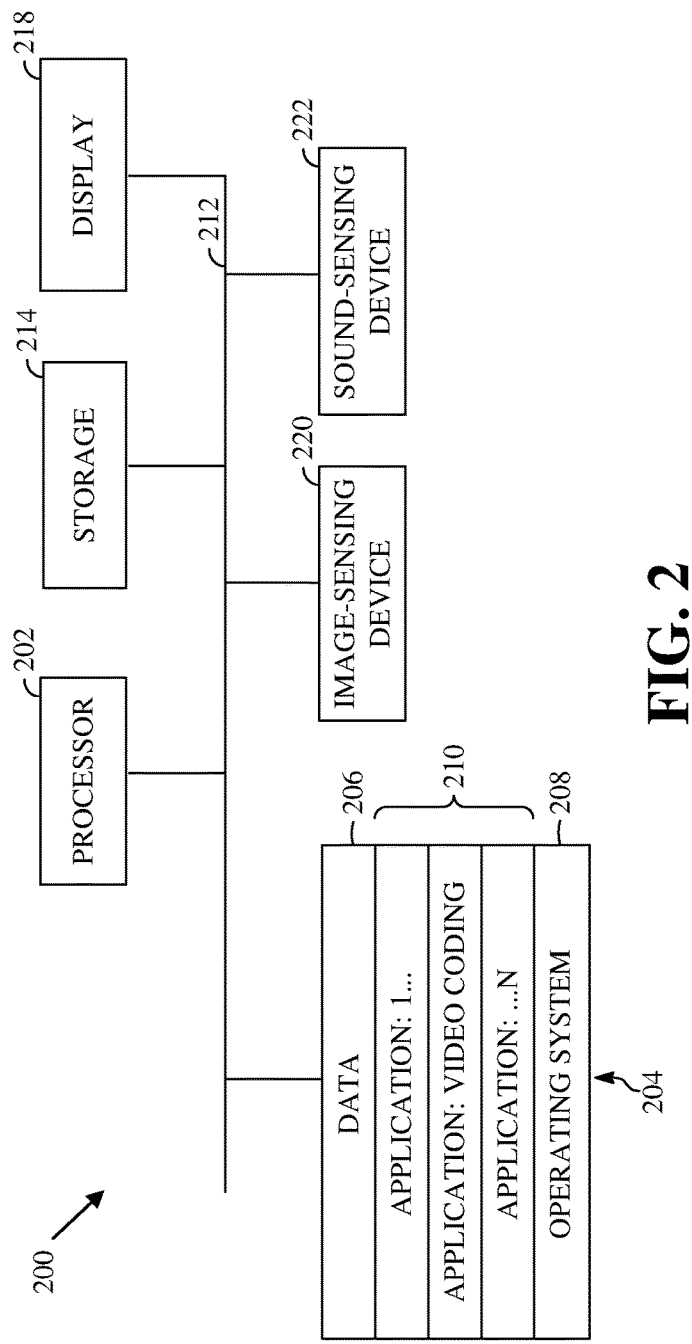
FIG. 2 is a block diagram of an example of a computing device that can implement a transmitting station or a receiving station.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used e.g., Hypertext Transfer Protocol-based (HTTP-based video) streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
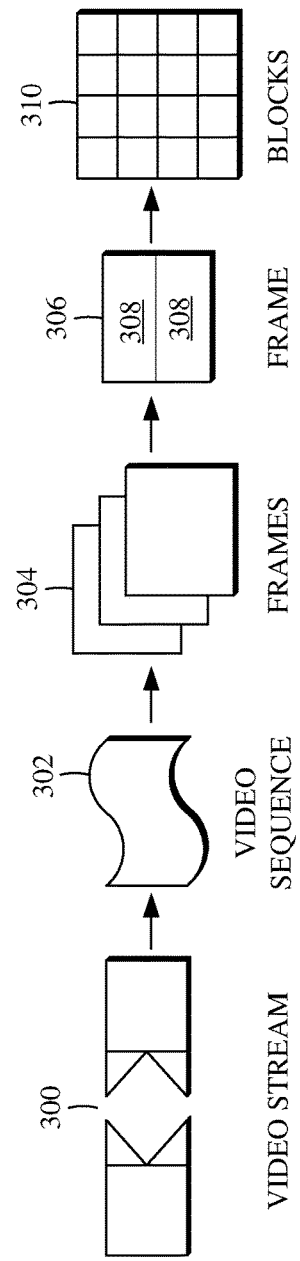
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
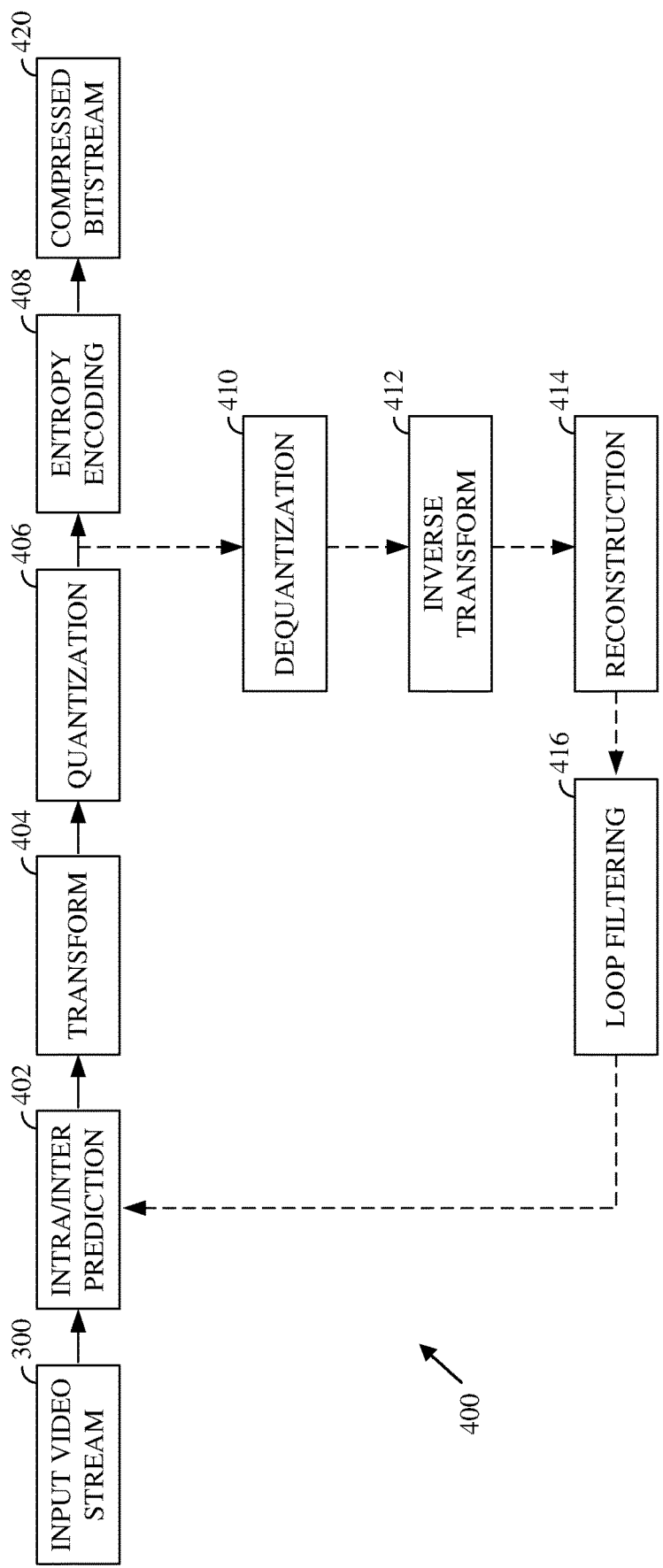
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artifacts.

Other variations of the encoder 400 can be used to encode the compressed bitstream 420. For example, a non-transform-based encoder 400 can quantize the residual signal directly without the transform stage 404 for certain blocks or frames. In another implementation, an encoder 400 can have the quantization stage 406 and the dequantization stage 410 combined into a single stage.

Figure 5:
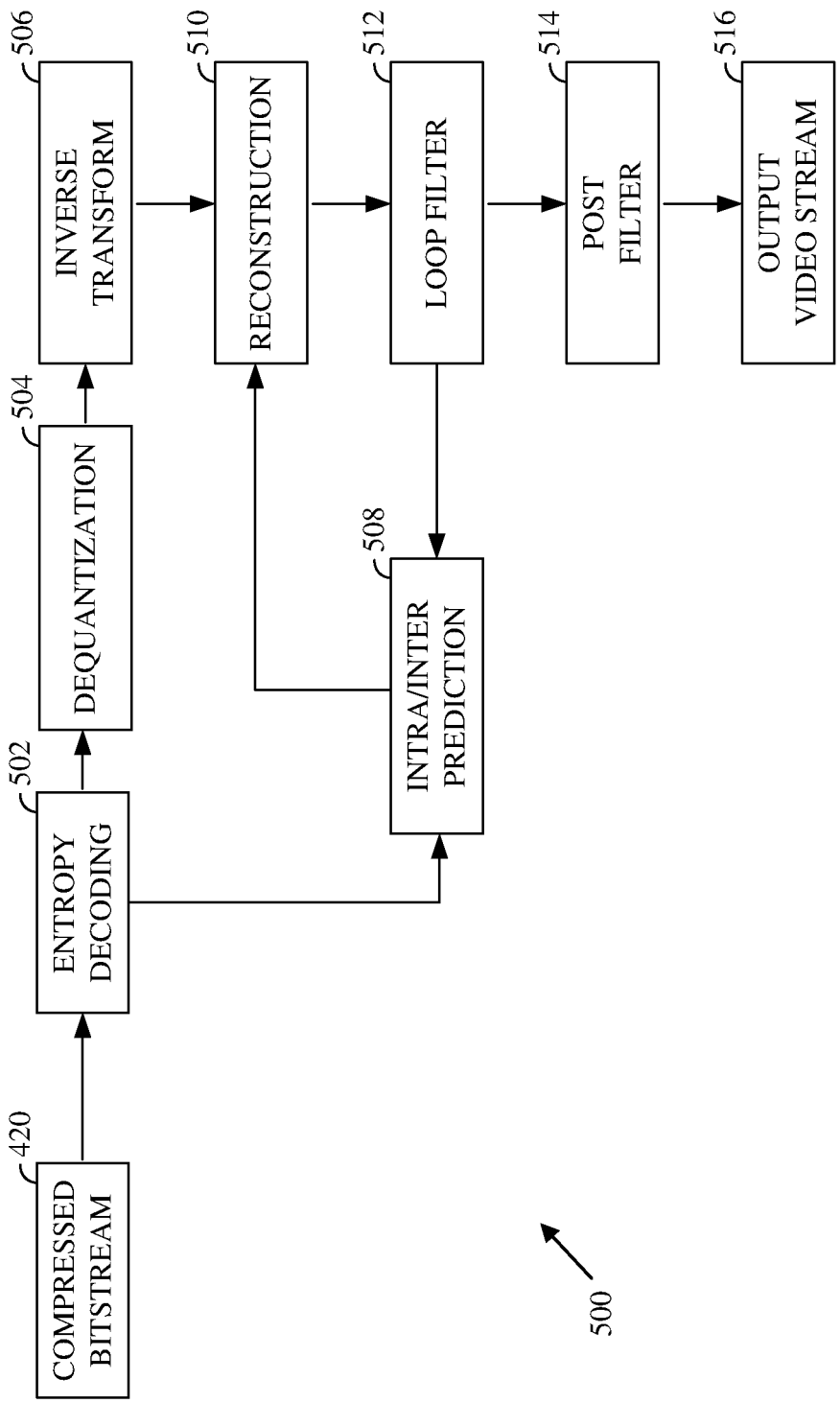
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/ inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

A codec can use multiple transform types. For example, a transform type can be the transform type used by the transform stage 404 of FIG. 4 to generate the transform block. For example, the transform type (i.e., an inverse transform type) can be the transform type to be used by the dequantization stage 504 of FIG. 5. Available transform types can include a one-dimensional Discrete Cosine Transform (1D DCT) or its approximation, a one-dimensional Discrete Sine Transform (1D DST) or its approximation, a two-dimensional DCT (2D DCT) or its approximation, a two-dimensional DST (2D DST) or its approximation, and an identity transform. Other transform types can be available. In an example, a one-dimensional transform (1D DCT or 1D DST) can be applied in one dimension (e.g., row or column), and the identity transform can be applied in the other dimension.

In the cases where a 1D transform (e.g., 1D DCT, 1D DST) is used (e.g., 1D DCT is applied to columns (or rows, respectively) of a transform block), the quantized coefficients can be coded by using a row-by-row (i.e., raster) scanning order or a column-by-column scanning order. In the cases where 2D transforms (e.g., 2D DCT) are used, a different scanning order may be used to code the quantized coefficients. As indicated above, different templates can be used to derive contexts for coding the non-zero flags of the non-zero map based on the types of transforms used. As such, in an implementation, the template can be selected based on the transform type used to generate the transform block. As indicated above, examples of a transform type include: 1D DCT applied to rows (or columns) and an identity transform applied to columns (or rows); 1D DST applied to rows (or columns) and an identity transform applied to columns (or rows); 1D DCT applied to rows (or columns) and 1D DST applied to columns (or rows); a 2D DCT; and a 2D DST. Other combinations of transforms can comprise a transform type.

Figure 6:
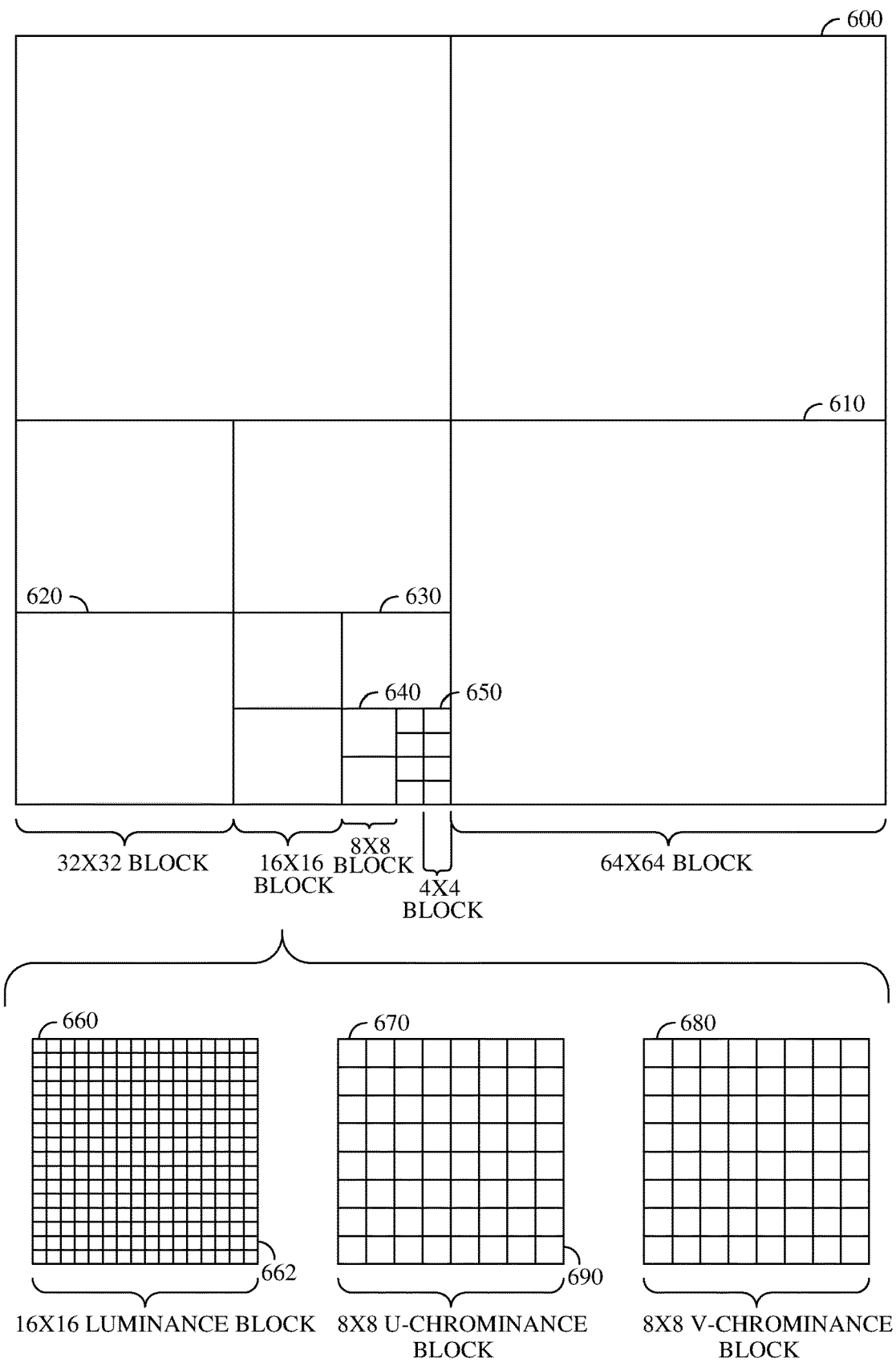
FIG. 6 is a block diagram of a representation of a portion of a frame according to implementations of this disclosure.

FIG. 6 is a block diagram of a representation of a portion 600 of a frame, such as the frame 306 of FIG. 3, according to implementations of this disclosure. As shown, the portion 600 of the frame includes four 64×64 blocks 610, which may be referred to as superblocks, in two rows and two columns in a matrix or Cartesian plane. A superblock can have a larger or a smaller size. While FIG. 6 is explained with respect to a superblock of size 64×64, the description is easily extendable to larger (e.g., 128×128) or smaller superblock sizes.

In an example, and without loss of generality, a superblock can be a basic or maximum coding unit (CU). Each superblock can include four 32×32 blocks 620. Each 32×32 block 620 can include four 16×16 blocks 630. Each 16×16 block 630 can include four 8×8 blocks 640. Each 8×8 block 640 can include four 4×4 blocks 650. Each 4×4 block 650 can include 16 pixels, which can be represented in four rows and four columns in each respective block in the Cartesian plane or matrix. The pixels can include information representing an image captured in the frame, such as luminance information, color information, and location information. In an example, a block, such as a 16×16-pixel block as shown, can include a luminance block 660, which can include luminance pixels 662; and two chrominance blocks 670/680, such as a U or Cb chrominance block 670, and a V or Cr chrominance block 680. The chrominance blocks 670/680 can include chrominance pixels 690. For example, the luminance block 660 can include 16×16 luminance pixels 662, and each chrominance block 670/680 can include 8×8 chrominance pixels 690, as shown. Although one arrangement of blocks is shown, any arrangement can be used. Although FIG. 6 shows N×N blocks, in some implementations, N×M, where N≠M, blocks can be used. For example, 32×64 blocks, 64×32 blocks, 16×32 blocks, 32×16 blocks, or any other size blocks can be used. In some implementations, N×2N blocks, 2N×N blocks, or a combination thereof can be used.

In some implementations, video coding can include ordered block-level coding. Ordered block-level coding can include coding blocks of a frame in an order, such as raster-scan order, wherein blocks can be identified and processed starting with a block in the upper left corner of the frame, or a portion of the frame, and proceeding along rows from left to right and from the top row to the bottom row, identifying each block in turn for processing. For example, the superblock in the top row and left column of a frame can be the first block coded, and the superblock immediately to the right of the first block can be the second block coded. The second row from the top can be the second row coded, such that the superblock in the left column of the second row can be coded after the superblock in the rightmost column of the first row.

In an example, coding a block can include using quad-tree coding, which can include coding smaller block units with a block in raster-scan order. The 64×64 superblock shown in the bottom-left corner of the portion of the frame shown in FIG. 6, for example, can be coded using quad-tree coding in which the top-left 32×32 block can be coded, then the top-right 32×32 block can be coded, then the bottom-left 32×32 block can be coded, and then the bottom-right 32×32 block can be coded. Each 32×32 block can be coded using quad-tree coding in which the top-left 16×16 block can be coded, then the top-right 16×16 block can be coded, then the bottom-left 16×16 block can be coded, and then the bottom-right 16×16 block can be coded. Each 16×16 block can be coded using quad-tree coding in which the top-left 8×8 block can be coded, then the top-right 8×8 block can be coded, then the bottom-left 8×8 block can be coded, and then the bottom-right 8×8 block can be coded. Each 8×8 block can be coded using quad-tree coding in which the top-left 4×4 block can be coded, then the top-right 4×4 block can be coded, then the bottom-left 4×4 block can be coded, and then the bottom-right 4×4 block can be coded. In some implementations, 8×8 blocks can be omitted for a 16×16 block, and the 16×16 block can be coded using quad-tree coding in which the top-left 4×4 block can be coded, and then the other 4×4 blocks in the 16×16 block can be coded in raster-scan order.

In an example, video coding can include compressing the information included in an original, or input, frame by omitting some of the information in the original frame from a corresponding encoded frame. For example, coding can include reducing spectral redundancy, reducing spatial redundancy, reducing temporal redundancy, or a combination thereof.

In an example, reducing spectral redundancy can include using a color model based on a luminance component (Y) and two chrominance components (U and V or Cb and Cr), which can be referred to as the YUV or YCbCr color model or color space. Using the YUV color model can include using a relatively large amount of information to represent the luminance component of a portion of a frame and using a relatively small amount of information to represent each corresponding chrominance component for the portion of the frame. For example, a portion of a frame can be represented by a high-resolution luminance component, which can include a 16×16 block of pixels, and by two lower resolution chrominance components, each of which representing the portion of the frame as an 8×8 block of pixels. A pixel can indicate a value (e.g., a value in the range from 0 to 255) and can be stored or transmitted using, for example, eight bits. Although this disclosure is described with reference to the YUV color model, any color model can be used.

Reducing spatial redundancy can include transforming a block into the frequency domain as described above. For example, a unit of an encoder, such as the entropy encoding stage 408 of FIG. 4, can perform a DCT using transform coefficient values based on spatial frequency.

Reducing temporal redundancy can include using similarities between frames to encode a frame using a relatively small amount of data based on one or more reference frames, which can be previously encoded, decoded, and reconstructed frames of the video stream. For example, a block or a pixel of a current frame can be similar to a spatially corresponding block or pixel of a reference frame. A block or a pixel of a current frame can be similar to a block or a pixel of a reference frame at a different spatial location. As such, reducing temporal redundancy can include generating motion information indicating the spatial difference (e.g., a translation between the location of the block or the pixel in the current frame and the corresponding location of the block or the pixel in the reference frame).

Reducing temporal redundancy can include identifying a block or a pixel in a reference frame, or a portion of the reference frame, that corresponds with a current block or pixel of a current frame. For example, a reference frame, or a portion of a reference frame, which can be stored in memory, can be searched for the best block or pixel to use for encoding a current block or pixel of the current frame. For example, the search may identify the block of the reference frame for which the difference in pixel values between the reference block and the current block is minimized and can be referred to as motion searching. The portion of the reference frame searched can be limited. For example, the portion of the reference frame searched, which can be referred to as the search area, can include a limited number of rows of the reference frame. In an example, identifying the reference block can include calculating a cost function, such as a sum of absolute differences (SAD), between the pixels of the blocks in the search area and the pixels of the current block.

The spatial difference between the location of the reference block in the reference frame and the current block in the current frame can be represented as a motion vector. The difference in pixel values between the reference block and the current block can be referred to as differential data, residual data, or as a residual block. In some implementations, generating motion vectors can be referred to as motion estimation, and a pixel of a current block can be indicated based on location using Cartesian coordinates such as $f_{x,y}$. Similarly, a pixel of the search area of the reference frame can be indicated based on a location using Cartesian coordinates such as $r_{x,y}$. A motion vector (MV) for the current block can be determined based on, for example, a SAD between the pixels of the current frame and the corresponding pixels of the reference frame.

As mentioned above, a current block can be predicted using intra prediction. An intra prediction mode uses pixels peripheral to the current block being predicted. Pixels peripheral to the current block are pixels outside the current block. Many different intra prediction modes can be available.

Some intra prediction modes use a single value for all pixels within the prediction block generated using at least one of the peripheral pixels. As an example, the VP9 codec includes an intra-prediction mode, referred to as true-motion (TM_PRED) mode in which all values of a prediction block have the value predicted pixel(x,y)=(top neighbor+left neighbor−topleft neighbor)$f$ or all x and y. As another example, a DC intra-prediction mode (DC_PRED) is such that each pixel of the prediction block is set to the value predicted pixel(x,y)=average value of entire top row and left column.

Other intra prediction modes, which may be referred to as directional intra prediction modes, are such that each can have a corresponding prediction angle. Other types of intra prediction modes can also be available.

An intra prediction mode may be selected by the encoder as part of a rate distortion loop. In brief, various intra prediction modes may be tested to determine which type of prediction will have the lowest distortion for a given rate, or number of bits to be transmitted in an encoded video bitstream, including overhead bits included in the bitstream to indicate the type of prediction used.

In an example codec, the following 13 intra prediction modes can be available: DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, and PAETH_PRED. One of the 13 intra prediction modes can be used to predict a luminance block.

Figure 7:
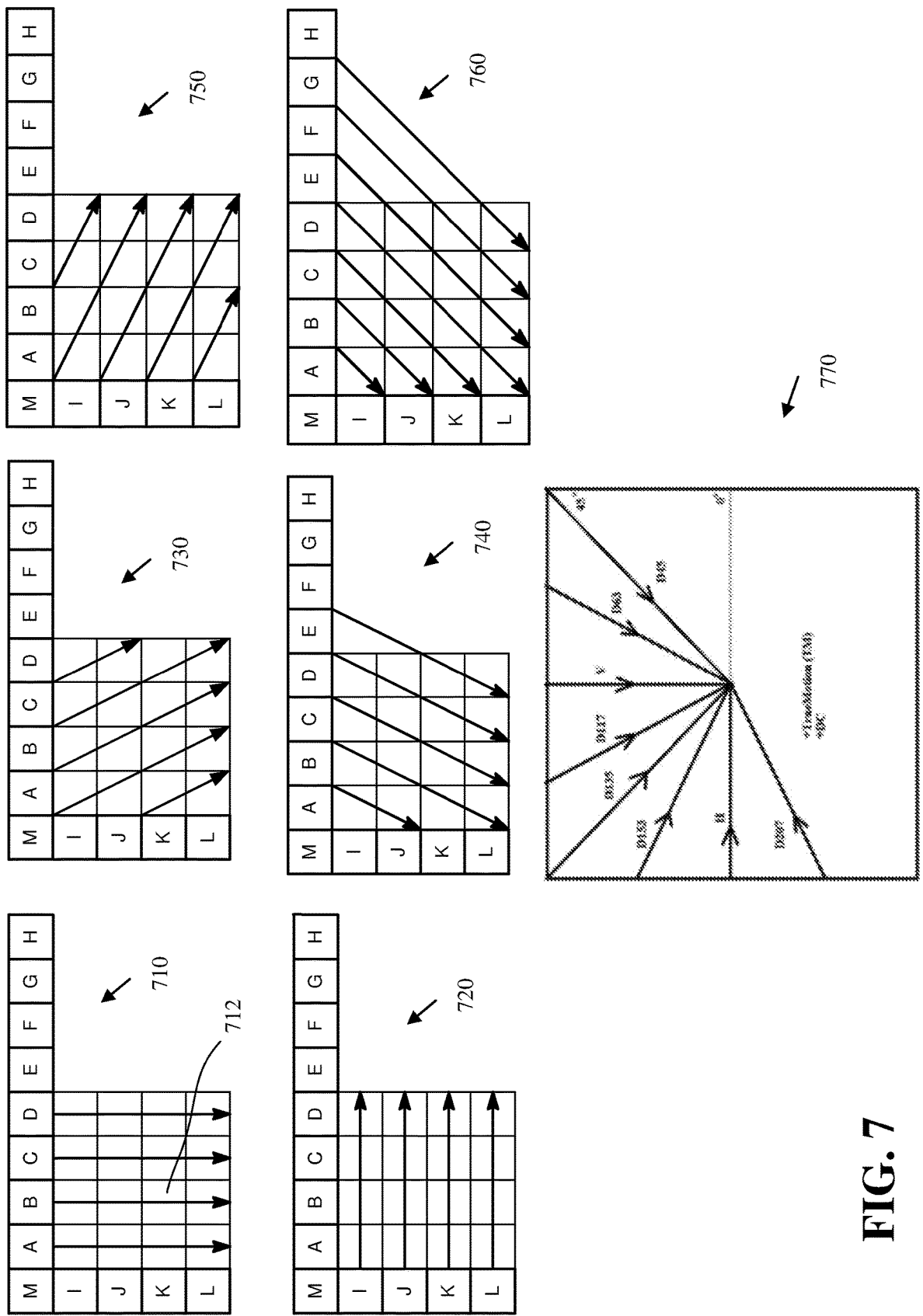
FIG. 7 is a diagram of examples of intra prediction modes according to implementations of this disclosure.

FIG. 7 is a diagram of examples of intra prediction modes according to implementations of this disclosure. Intra prediction mode 710 illustrates the V_PRED intra prediction mode, which is referred to generally as a vertical intra prediction mode. In this mode, prediction block pixels in the first column are set to the value of peripheral pixel A; prediction block pixels in the second column are set to the value of pixel B; prediction block pixels in the third column are set to the value of pixel C; and prediction block pixels in the fourth column are set to the value of pixel D.

Intra prediction mode 720 illustrates the H_PRED intra prediction mode, which is referred to generally as a horizontal intra prediction mode. In this mode, prediction block pixels in the first row are set to the value of peripheral pixel I; prediction block pixels in the second row are set to the value of pixel J; prediction block pixels in the third row are set to the value of pixel K; and prediction block pixels in the fourth row are set to the value of pixel L.

Intra prediction mode 730 illustrates the D117_PRED intra prediction mode, so-called because the direction of the arrows, along which the peripheral pixels will be propagated to generate the prediction block form a diagonal, is at an angle of about 1170 from the horizontal. That is, in the D117_PRED, the prediction angle is 117°. Intra prediction mode 740 illustrates the D63_PRED intra prediction mode, which corresponds to a prediction angle of 63°. Intra prediction mode 750 illustrates the D153_PRED intra prediction mode, which corresponds to a prediction angle of 153°. Intra prediction mode 760 illustrates the D135_PRED intra prediction mode, which corresponds to a prediction angle of 135°.

The prediction modes D45_PRED and D207_PRED (not shown) correspond, respectively, to the prediction angles 45° and 207°. DC_PRED corresponds to a prediction mode where all prediction block pixels are set to a single value that is a combination of the peripheral pixels A through M.

In the PAETH_PRED intra prediction mode, the prediction value of a pixel is determined as follows: 1) calculate a base value as a combination of some peripheral pixels, and 2) use, as the prediction pixel, the one peripheral pixel of the some peripheral pixels that is closest to the base value. The PAETH_PRED intra prediction mode is illustrated using, as an example, a pixel 712 (at location x=1, y=2). In an example of a combination of some peripheral pixels, the base value can be calculated as base=B+K−M. That is, the base value is equal to: the value of the left peripheral pixel that is in the same row as the pixel to be predicted+the value of the above peripheral pixel that is in the same column as the pixel−the value of the pixel in the top-left corner.

In the SMOOTH_V intra prediction mode, the prediction pixels of the bottom-most row of the prediction block are estimated with the value of the last pixel in the left column (i.e., the value of pixel at location L). The remaining pixels of the prediction block are calculated by quadratic interpolation in the vertical direction.

In the SMOOTH_H intra prediction mode, the prediction pixels of the right-most column of the prediction block are estimated with the value of the last pixel in the top row (i.e., the value of pixel at location D). The remaining pixels of the prediction block are calculated by quadratic interpolation in the horizontal direction.

In the SMOOTH_PRED intra prediction mode, the prediction pixels of the bottom-most row of the prediction block are estimated with the value of the last pixel in the left column (i.e., the value of pixel at location L) and the prediction pixels of the right-most column of the prediction block are estimated with the value of the last pixel in the top row (i.e., the value of pixel at location D). The remaining pixels of the prediction block are calculated as scaled weighted sums. For example, the value of a prediction pixel at location (i,j) of the prediction block can be calculated as the scaled weighted sum of the values of pixels $L_j$, R, $T_i$, and B. The pixel $L_j$ is a pixel in the left column and on the same row as the prediction pixel. The pixel R is the pixel as provided by SMOOTH_H. The pixel $T_i$ is a pixel in the above row and on the same column as the prediction pixel. The pixel B is the pixel as provided by SMOOTH_V. The weights can be equivalent to a quadratic interpolation in the horizontal and vertical directions.

The intra prediction mode selected by the encoder can be transmitted to a decoder in the bitstream. The intra prediction mode can be entropy coded (encoded by the encoder and/or decoded by a decoder) using a context model.

Some codecs use the intra prediction modes of the left and above neighbor blocks as the context for coding the intra prediction mode of a current block. Using FIG. 7 as an example, the left neighbor block can be the block containing the pixels I-L, and the above neighbor block can be the block containing the pixels A-D.

A diagram 770 illustrates the intra-prediction modes available in the VP9 codec. The VP9 coded supports a set of 10 intra-prediction modes for block sizes ranging from 4×4 up to 32×32. These intra-prediction modes are DC_PRED, TM_PRED, H_PRED, V_PRED, and 6 oblique directional prediction modes: D45_PRED, D63_PRED, D117_PRED, D135_PRED, D153_PRED, D207_PRED, corresponding approximately to angles 45, 63, 117, 135, 153, and 207 degrees (counterclockwise measured against the horizontal axis).

Figure 8:
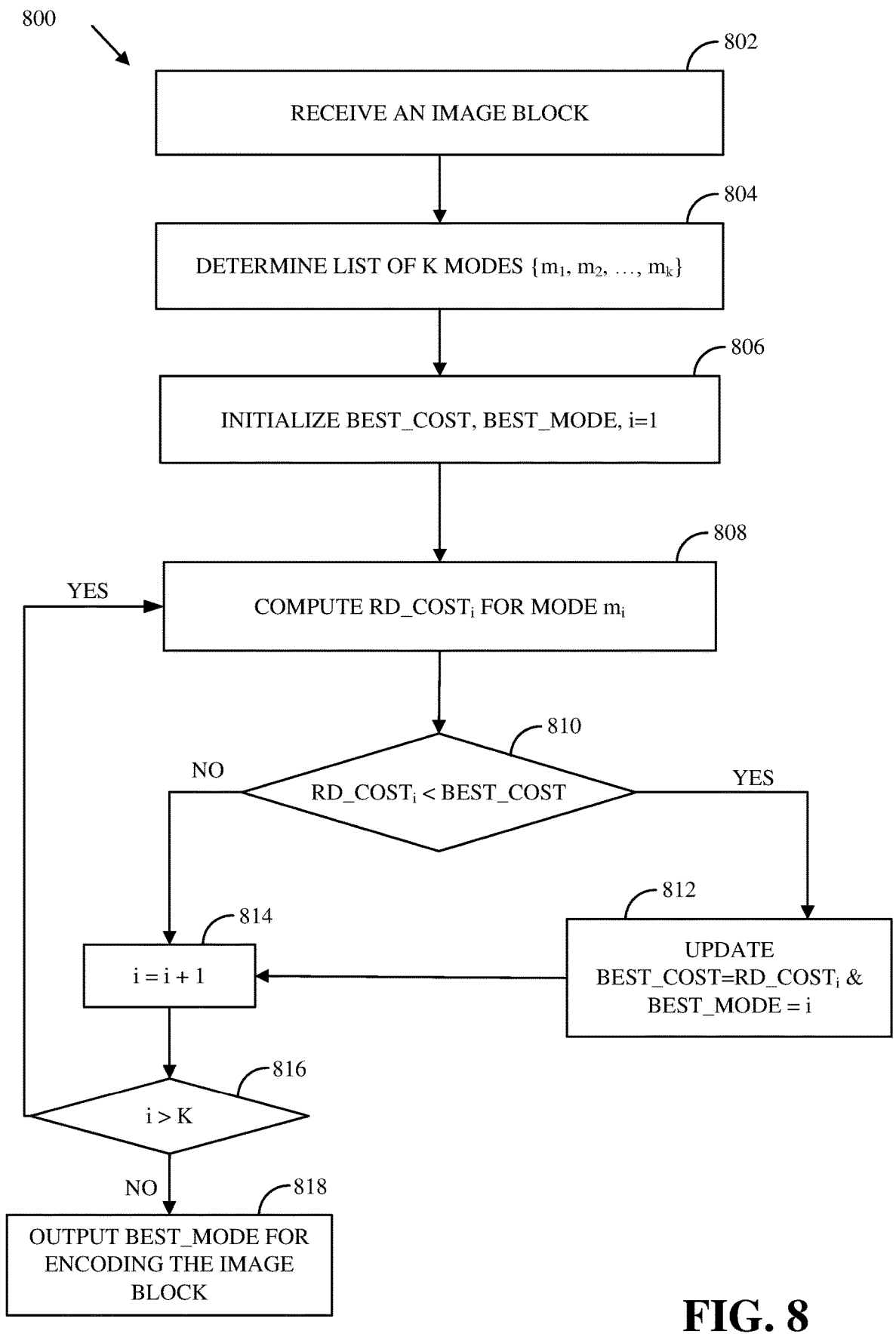
FIG. 8 is a flowchart of a process for searching for a best mode to code a block.

FIG. 8 is a flowchart of a process 800 for searching for a best mode to code a block. The process 800 is an illustrative, high-level process of a mode decision process that determines a best mode using the brute-force approach. For ease of description, the process 800 is described with respect to selecting an intra-prediction mode for encoding a prediction block. Other examples of best modes that can be determined by processes similar to the process 800 include determining a transform type and determining a transform size. The process 800 can be implemented by an encoder, such as the encoder 400 of FIG. 4, using a brute-force approach to mode decision.

At 802, the process 800 receives an image block. As the process 800 is described with respect to determining an intra-prediction mode, the image block can be a prediction unit. As described with respect to FIG. 7, each of the leaf node coding blocks (e.g., a block 702-1, 702-5, 702-6, 702-7, 702-8, 702-3, or 702-4) can be partitioned into one or more prediction units. As such, the image block can be one such prediction unit.

At 804, the process 800 determines (e.g., selects, calculates, choses, etc.) a list of modes. The list of modes can include K modes, where K is an integer number. The list of modes can be denoted {$m_1, m_2, \ldots, m_k$}. The encoder can have available a list of intra-prediction modes. For example, the list of available intra-prediction modes can be {DC_PRED, TM_PRED, V_PRED, H_PRED, D45_PRED, D135_PRED, D117_PRED, D153_PRED, D207_PRED, D63_PRED}. In another example, the list of available intra-prediction modes can be {DC_PRED, V_PRED, H_PRED, D45_PRED, D135_PRED, D117_PRED, D153_PRED, D207_PRED, D63_PRED, SMOOTH_PRED, SMOOTH_V_PRED, and SMOOTH_H_PRED, PAETH_PRED}. A description of these intra-prediction modes is omitted as the description is impertinent to the understanding of this disclosure. The list of modes determined at 804 can be any subset of the list of available intra-prediction modes.

At 806, the process 800 initializes a BEST_COST variable to a high value (e.g., INT_MAX, which may be equal to 2,147,483,647) and initializes a loop variable i to 1, which corresponds to the first mode to be examined.

At 808, the process 800 computes (e.g., calculates) an $RD\_COST_i$ for the $mode_i$. At 810, the process 800 tests whether the rate-distortion (RD) cost, $RD\_COST_i$, of the current mode under examination, $mode_i$, is less than the current best cost, BEST_COST. If the test is positive, then at 812, the process 800 updates the best cost to be the cost of the current mode (i.e., BEST_COST=$RD\_COST_i$) and sets the current best mode index (BEST_MODE) to the loop variable i (BEST_MODE=i). The process 800 then proceeds to 814 to increment the loop variable i (i.e., i=i+1) to prepare for examining the next mode (if any). If the test is negative, then the process 800 proceeds to 814.

At 816, if there are more modes to examine, the process 800 proceeds back to 808; otherwise the process 800 proceeds to 816. At 818, the process 800 outputs the index of the best mode, BEST_MODE. Outputting the best mode can mean returning the best mode to a caller of the process 800. Outputting the best mode can mean encoding the image using the best mode. Outputting the best mode can have other semantics. The process 800 terminates after outputting the best mode.

Figure 9:
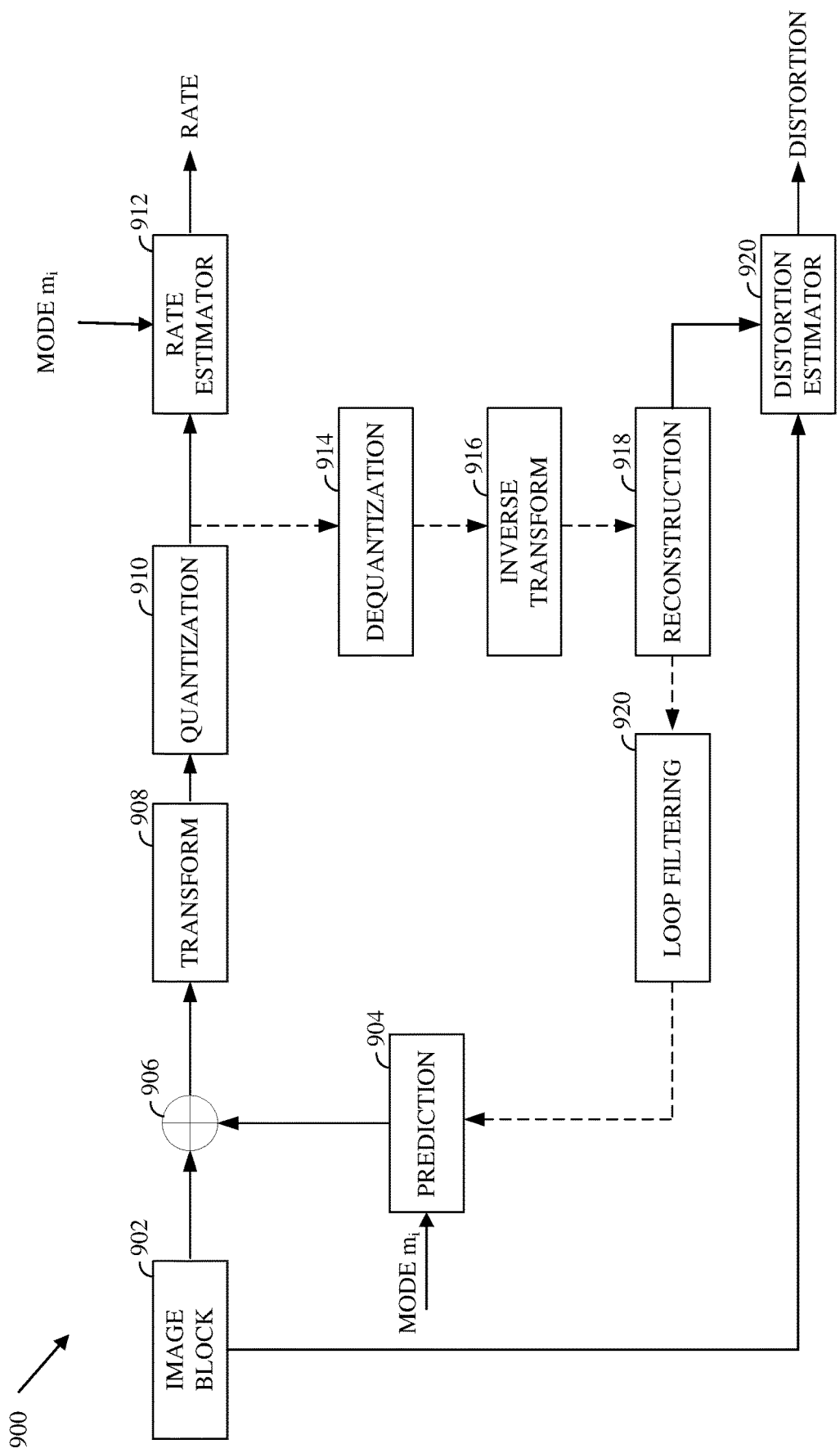
FIG. 9 is a block diagram of an example of estimating the rate and distortion costs of coding an image block by using a prediction mode.

FIG. 9 is a block diagram of an example 900 of estimating the rate and distortion costs of coding an image block X by using a prediction mode $m_i$. The process 900 can be performed by an encoder, such as the encoder 400 of FIG. 4. The process 900 includes performing a hypothetical encoding of the image block X using the prediction mode $m_i$ to determine the RD cost of encoding the block. The process 900 can be used by the process 800 at 808.

A hypothetical encoding process is a process that carries out the coding steps but does not output bits into a compressed bitstream, such as the compressed bitstream 420 of FIG. 4. Because the purpose is to estimate a rate (also referred as bit rate), a hypothetical encoding process may be regarded or called a rate estimation process. The hypothetical encoding process computes the number of bits (RATE) required to encode the image block X. The example 900 also calculates a distortion (DISTORTION) based on a difference between the image block X and a reconstructed version of the image block X.

At 904, a prediction, using the mode $m_i$, is determined. The prediction can be determined as described with respect to intra/inter-prediction stage 402 of FIG. 4. At 906, a residual is determined as a difference between the image block 902 and the prediction. At 908 and 910, the residual is transformed and quantized, such as described, respectively, with respect to the transform stage 404 and the quantization stage 406 of FIG. 4. The rate (RATE) is calculated by a rate estimator 912, which performs the hypothetical encoding. In an example, the rate estimator 912 can perform entropy encoding, such as described with respect to the entropy encoding stage 408 of FIG. 4.

The quantized residual is dequantized at 914 (such as described, for example, with respect to the dequantization stage 410 of FIG. 4), inverse transformed at 916 (such as described, for example, with respect to the inverse transform stage 412 of FIG. 4), and reconstructed at 918 (such as described, for example, with respect to the reconstruction stage 414 of FIG. 4) to generate a reconstructed block. A distortion estimator 920 calculates the distortion (i.e., the loss in video quality) between the image block X and the reconstructed block. In an example, the distortion can be a mean square error between pixel values of the image block X and the reconstructed block. The distortion can be a sum of absolute differences error between pixel values of the image block X and the reconstructed block. Any other suitable distortion measure can be used.

The rate, RATE, and distortion, DISTORTION, are then combined into a scalar value (i.e., the RD cost) by using the Lagrange multiplier as shown in formula (5)

$$\text{DISTORTION} + \lambda_{mode} \times \text{RATE}, \quad (5)$$

The Lagrange multiplier $\lambda_{mode}$ of the formula 5 can be calculated as described above, depending on the encoder performing the operations of the example 900.

FIGS. 8 and 9 illustrate that the traditional (i.e., brute-force) approach to mode decision is largely a serial process that essentially codes an image block X by using candidate modes to determine the mode with the best cost. Techniques have been used to reduce the complexity in mode decision. For example, early termination techniques have been used to terminate the loop of the process 800 of FIG. 8 as soon as certain conditions are met, such as, for example, that the rate distortion cost is lower than a threshold.

Other techniques include selecting, for example based on heuristics, a subset of the available candidate modes or using multi-passes over the candidate modes. As such, in most codec, heuristics are used to pick the top N candidates (i.e., N candidate intra-prediction modes) among all possible modes, and rate-distortion optimization is usually used only on these top N candidates to pick the best candidate. In a typical case, the N candidates can include a most-probable candidate. The heuristics can include metrics such as the simple sum of absolute differences (SAD), sum of absolute transformed differences (SATD), mean square error (MSE), or some other heuristic metric. That is, for example, when encoding a current block and given a candidate intra-prediction mode $m_i$, a prediction block is determined and one or more of the heuristic metrics (e.g., SAD, SATD, MSE, etc.) is calculated between the current block and the prediction block.

Such readily available (e.g., calculable) heuristic metrics (i.e., heuristic features) can be included in an ML model for intra-prediction mode selection as input features and be expected to improve the prediction accuracy of the ML model.

Figure 10A:
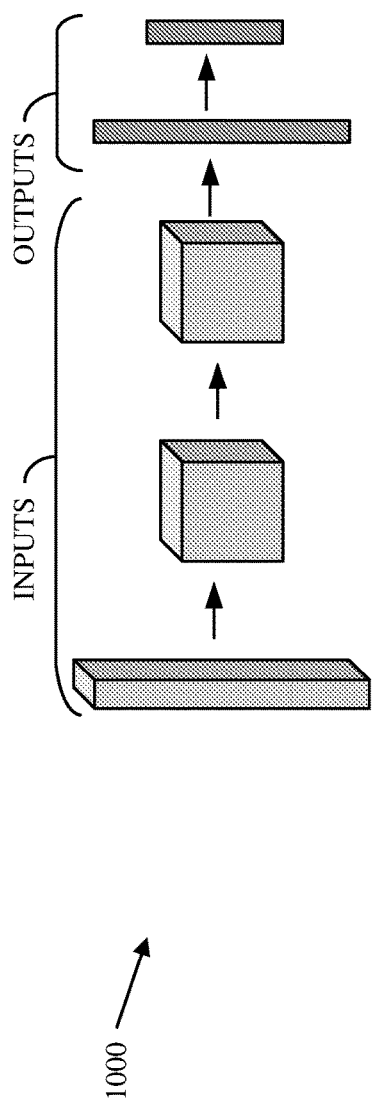
FIGS. 10A and 10B are block diagrams of examples of convolutional neural networks (CNNs) for mode decisions.
Figure 10B:
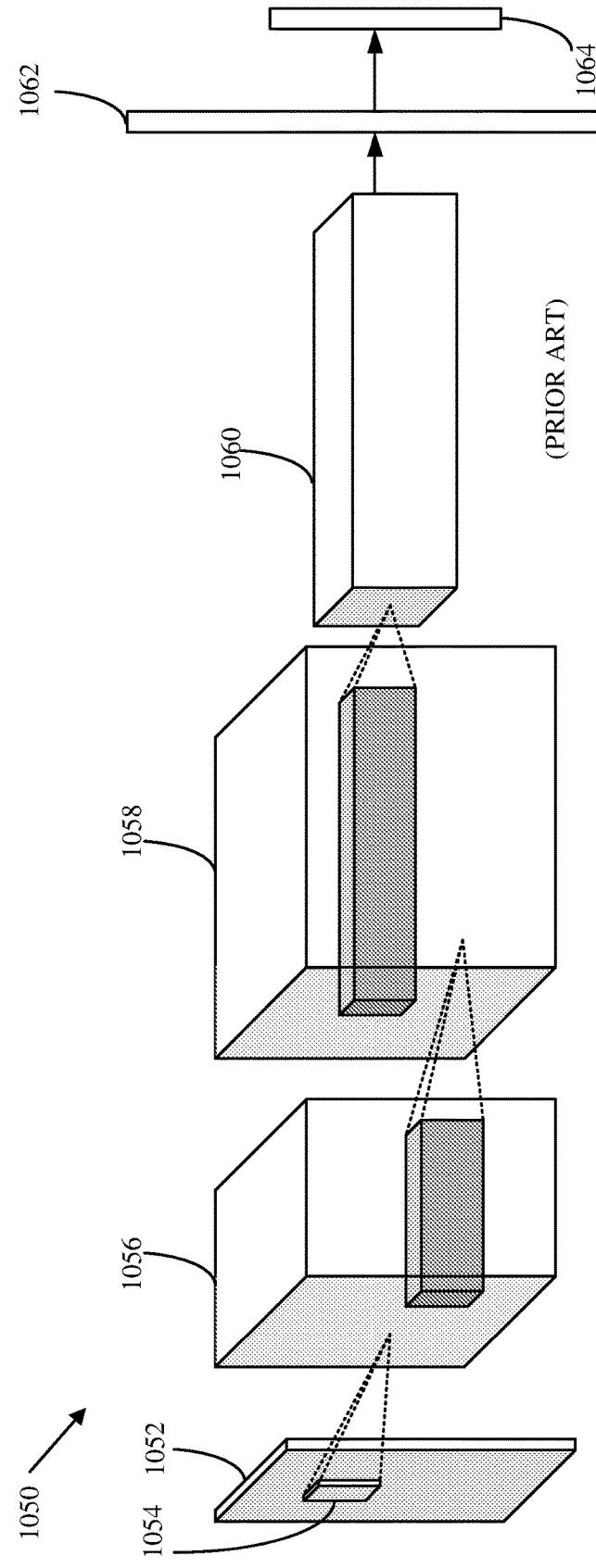

FIGS. 10A and 10B are block diagrams of examples 1000 and 1050 of convolutional neural networks (CNNs) for mode decisions.

FIG. 10A illustrates a high-level block diagram of an example 1000 of a typical CNN network, or simply a CNN. As mentioned above, a CNN is an example of a machine-learning model. In a CNN, a feature extraction portion typically includes a set of convolutional operations, which is typically a series of filters that are used to filter an input image based on a filter (typically a square of size k, without loss of generality). For example, and in the context of machine vision, these filters can be used to find features in an input image. The features can include, for example, edges, corners, endpoints, and so on. As the number of stacked convolutional operations increases, later convolutional operations can find higher-level features.

In a CNN, a classification portion is typically a set of fully connected (FC) layers, which may also be referred to as dense operations. The fully connected layers can be thought of as looking at all the input features of an image to generate a high-level classifier. Several stages (e.g., a series) of high-level classifiers eventually generate the desired classification output.

As mentioned, a typical CNN network is composed of several convolutional operations (e.g., the feature-extraction portion) followed by several fully connected layers. The number of operations of each type and their respective sizes is typically determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter is applied to a subset of the input data at a time, the filter is applied across the full input, such as by sweeping over the input. The operations performed by this layer are typically linear/matrix multiplications. The output of the convolution filter may be further filtered using an activation function. The activation function may be a linear function or non-linear function (e.g., a sigmoid function, an arcTan function, a tan H function, a ReLu function, or the like).

Each of the fully connected operations is a linear operation in which every input is connected to every output by a weight. As such, a fully connected layer with N number of inputs and M outputs can have a total of N×M weights. As mentioned above, a Dense operation may be generally followed by a non-linear activation function to generate an output of that layer.

Some CNN network architectures used to perform analysis of frames and superblocks (such as to infer a partition as described herein), may include several feature extraction portions that extract features at different granularities (e.g., at different sub-block sizes of a superblock) and a flattening layer (which may be referred to as a concatenation layer) that receives the output(s) of the last convolution layer of each of the extraction portions. The flattening layer aggregates all the features extracted by the different feature extraction portions into one input set. The output of the flattening layer may be fed into (i.e., used as input to) the fully connected layers of the classification portion. As such, the number of parameters of the entire network may be dominated (e.g., defined, set, etc.) by the number of parameters at the interface between the feature extraction portion (i.e., the convolution layers) and the classification portion (i.e., the fully connected layers). That is, the number of parameters of the network is dominated by the parameters of the flattening layer.

The machine-learning model of such architectures tend to have a large number of parameters and operations. In some situations, the machine-learning model may include millions of parameters. Such large models may not be effectively or efficiently used, if at all, to infer classifications on devices (e.g., mobile devices) that may be constrained (e.g., computationally constrained, energy constrained, and/or memory constrained). That is, some devices may not have sufficient computational capabilities (for example, in terms of speed) or memory storage (e.g., RAM) to handle (e.g., execute) such large models.

FIG. 10B illustrates a high-level block diagram of an example 1050 of a prior art CNN for predicting one of the 35 intra prediction modes in HEVC. In CNNs such as the example 1050, convolutional layers are used for extracting features and fully connected layers are used as the classification layers.

In the example 1050, a current block (e.g., a current block 1054) of a frame (e.g., a frame 1052) to be encoded can be fed through one or more convolutional layers (e.g., convolutional layers 1056 and 1058), one or more max pooling layers (e.g., a pooling layer 1060), and one or more fully connected layers (e.g., fully connected layers 1062 and 1064).

The capacity of the model (i.e., the example 1050) is chosen such that a good trade-off between a low training error and a good generalization can be achieved. In the final layer (i.e., the fully connected layer 1064), a classification into 35 classes (i.e. intra prediction modes) is carried out.

In analyzing the performance of architectures such as the example 1050, several observations can be made.

A first observation is that such models tend to be large; that is, such models have a large number of parameters and operations (e.g., over 67 million parameters for a 32×32 block). The large number of parameters and operations can make such models impractical to operate (e.g., use for inference) on computation- or size-constrained platforms such as mobile platforms.

A second observation is that important features, such as QP and/or codec-generated heuristics, may not exploited (i.e., are not used as inputs to the model). Such features can have significant impact on the decision of the optimal intra-prediction mode.

A third observation is that the output of CNN is used to completely replace the current codec decision. The codec decision is disregarded (e.g., replaced) regardless of the confidence level of the ML in its prediction.

With respect to the first observation, it is desirable that ML models be as small (e.g., ultra light) as possible. With respect to the second observation, the inventors have discovered that inserting non-linear combinations of QP greatly improves the accuracy of the ML model. This is especially the case on deeply scaled down network models (e.g., ultra-light models). With respect to the third observation, a better approach would be, depending on the confidence level of the ML prediction, adaptively combining the ML prediction and existing heuristics-based codec decisions to optimize the mode selection accuracy. In an example, the existing heuristics-based codec decisions can include using ML model inputs that are derived from one or more candidate modes, such as a most-probable intra-prediction mode (MPM).

Figure 11:
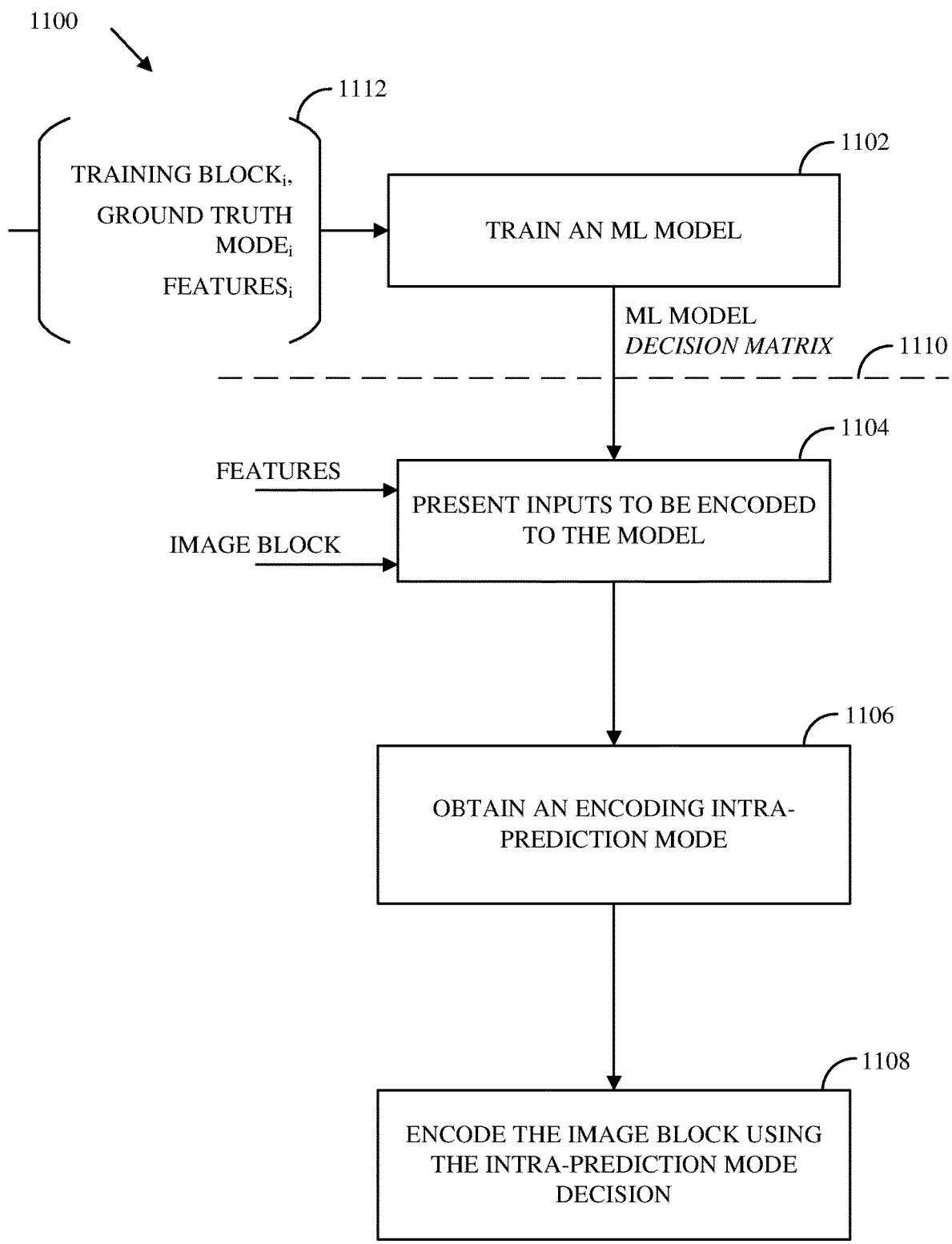
FIG. 11 is a flowchart of a process for encoding, by an encoder, an image block using intra-prediction according to implementations of this disclosure.

FIG. 11 is a flowchart of a process 1100 for encoding, by an encoder (i.e., a first encoder), an image block using intra-prediction according to implementations of this disclosure. The process 1100 trains, using input data, a machine-learning model to infer a mode decision, such as an intra-prediction mode decision (i.e., an ML intra-prediction mode). The process 1100 then uses the trained machine-learning model to infer a mode decision (e.g., an ML intra-prediction mode) for encoding an image block (i.e., a current block). The current block can be a luminance (Y) block, a chrominance (U or V) block, or any other type of image block that is to be encoded using intra-prediction. The image block can be of M×N size, where M can be equal to N. That is, the image block can be any type and size of a block that is capable of being encoded using intra-prediction.

At 1102, the process 1100 trains the machine-learning (ML) model. The ML model can be trained using training data 1112. Each training datum of the training data 1112 can include a video block that was encoded by traditional encoding methods (e.g., by a second encoder), such as described with respect to FIGS. 4 and 6-9; a ground truth intra-prediction mode decision; pre-calculated features; and zero or more additional inputs. The ground truth intra-prediction mode decision is the intra-prediction mode that the second encoder determined for the block using, for example, a brute-force approach.

In the training phase, parameters of the ML model are generated such that, for at least some of the training data, the ML model can infer, for a training datum, the resulting intra-prediction mode decision (i.e., the ML intra-prediction mode) of the training datum. Desirably, for every input block, the ML intra-prediction mode (i.e., the mode inferred by the ML model) is the same as the ground truth intra-prediction mode decision.

The pre-calculated features are so called (i.e., "pre-calculated") to distinguish them from features that may be extracted (e.g., derived, inferred, etc.) by a deep learning neural network (such as a convolutional neural network).

In an example, the machine-learning (ML) model can be a small, all-dense network structure. That is, the ML model only includes fully connected layers and does not include convolutional and/or feature-extraction layers.

Figures 12A, 12B:
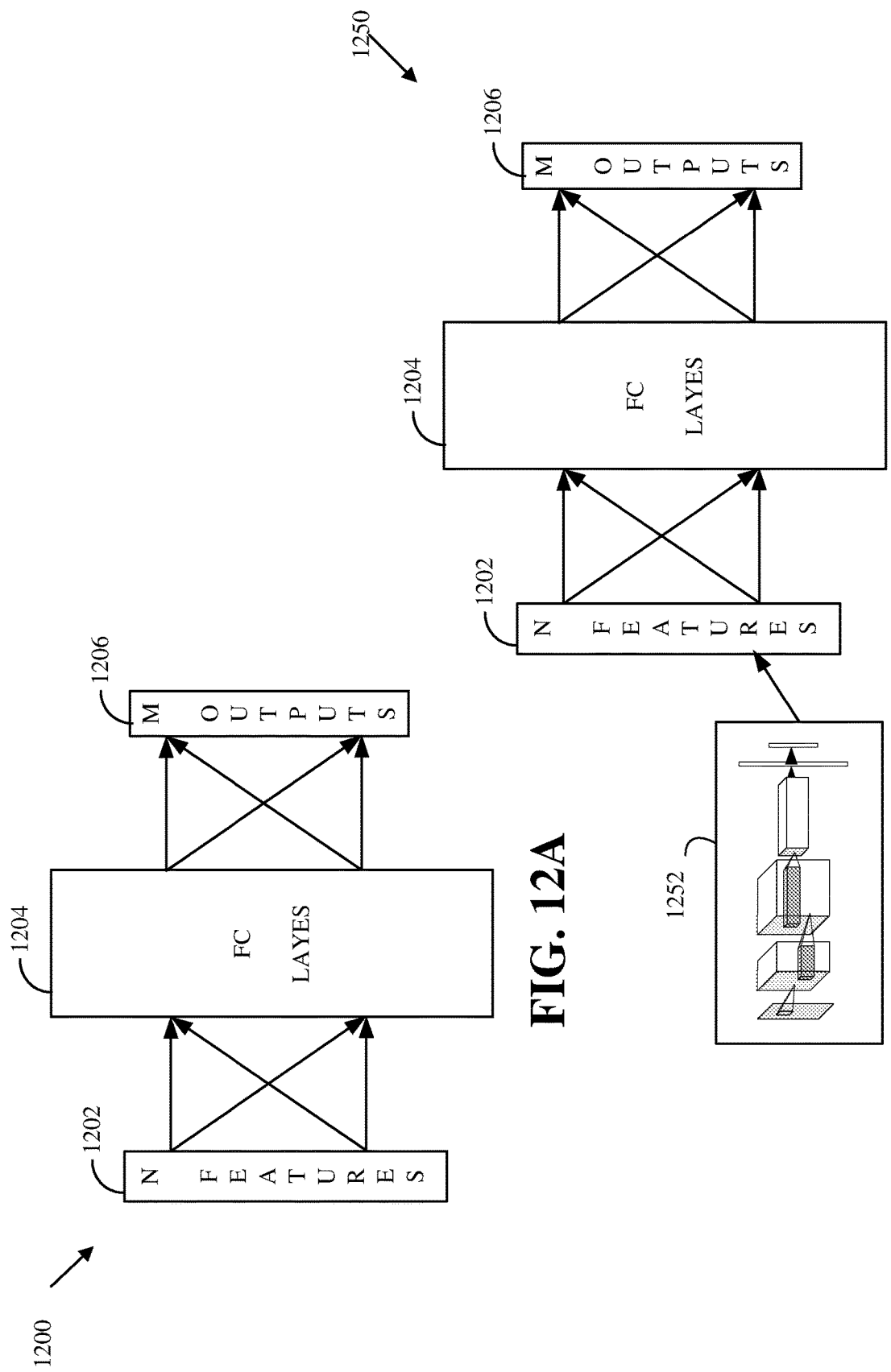
FIG. 12A is a diagram of an example of an all-dense network structure according to implementations of this disclosure.
FIG. 12B is a diagram of an example of a network structure according to implementations of this disclosure.

FIG. 12A is a diagram of an example 1200 of an all-dense network structure according to implementations of this disclosure. An input layer 1202 includes N number of pre-calculated features which are input to hidden layers 1204. M outputs are output from an output layer 1206. In an example, the hidden layers 1204 includes only one hidden layer with 50 nodes. The M outputs of the output layer 1206 correspond to the number of available intra-prediction modes in the encoder in/with which the example 1200 is used. For example, if the example 1200 is to be used with VP9, which includes 10 available intra-prediction modes, then M=10.

In an example, N pre-calculated features can be 17 pre-calculated features. However, additional or fewer features can be used. In an example, one or more of the pre-calculated features can be scalar values. The pre-calculated features are now described with respect to a current block. During the training phase, the current block is a training block. During the inferencing phase (described below), the current block is a block for which an intra-prediction mode is to be inferred.

The example 1200, as described herein, includes roughly 1600 parameters, which is significantly smaller than the CNN models described above.

A first pre-calculated feature can be a non-linear function of a quantization parameter.

As is known, quantization parameters in video codecs can be used to control the tradeoff between rate and distortion. Usually, a larger quantization parameter means higher quantization (such as of transform coefficients) resulting in a lower rate but higher distortion; and a smaller quantization parameter means lower quantization resulting in a higher rate but a lower distortion. The variables QP, q, and Q may be used interchangeably in this disclosure to refer to a quantization parameter.

As the quantization parameter can be used to control the tradeoff between rate and distortion, the quantization parameter can be used to calculate the metrics associated with each combination of parameters. The metric can combine the rate and the distortion values of a combination of encoding parameters. In an example, the QP can be used to derive a multiplier that is used to combine the rate and distortion values into one metric. Some codecs may refer to the multiplier as the Lagrange multiplier (denoted $\lambda_{mode}$); other codecs may use a similar multiplier that is referred as rdmult. Each codec may have a different method of calculating the multiplier. For example, HEVC uses the formula $\lambda_{mode}=0.85\times2^{(QP-12)/3}$. For example, H.263 uses the formula $\lambda_{mode}=0.85\cdot Q_{H263}^2$. For example, VP9 uses the formula rdmult=$88\cdot q^2/24$. For example, AV1 uses the formula $\lambda_{mode}=0.12\ Q_{AV1}^2/256$.

The quantization parameter can be an important feature in determining the best mode (i.e., the encoding intra-prediction mode). As such, in an example, QP should be used as an input feature to the ML model. As can be seen in the above formulas, the multiplier has a non-linear relationship to the quantization parameter. As such, in another example, a non-linear function (e.g., value) of the QP can be used as an input to the ML model. In an example, log(qp) can be used. A non-linear QP can greatly improve the accuracy of the ML model. Furthermore, log(qp), when multiplied by any resulting training weight, can nicely imitate a QP polynomial with high orders (e.g., QP, $QP^2$, $QP^3$, etc.). In terms of the log function, the ML model can correspondingly learn n*log(qp), where n corresponds to a polynomial exponent. Said another way, the ML model can learn a multinomial expression of the quantization parameter, such as $log(QP)+log(QP)^2+log(QP)^3$. In yet another example, the non-linear function $f(QP)=QP^\alpha$, where is a integer that is not equal to 0 or 1 (i.e., a≠0 and a≠1), can be used. In an example, α=2. In the general case, the non-linear function is of a same type as a function used by the second encoder for determining a multiplier used in a rate-distortion calculation, as described above.

Second pre-calculated features can be respective errors between the current block (I(x,y)) and respective prediction blocks. That is, for each available intra-prediction mode (model), a respective prediction block (i.e., I'(x,y)) is calculated (e.g., determined, derived, obtained, etc.), and an error (e.g., $cost_i$) is calculated between the current block and the respective prediction block. In an example, the cost can be the sum of absolute differences (SAD). As such, for each $mode_i$, a $cost_i$ is calculated as $cost_i=\Sigma_{for\ all\ x\ and\ y}|I'(x,y)-I(x,y)|$. Other examples of errors/costs (such as sum of square differences or some other error) can be used. As such, in the case of VP9, where there are 10 available intra-prediction modes, 10 costs can be calculated. These block-based SAD costs can carry significant information regarding what the optimal prediction mode might be.

In an example, the second pre-calculated costs can be costs associated with a subset of the available intra-prediction modes. For example, costs may be calculated for directional intra-prediction modes. As such, with respect to VP9, costs may not be calculated, as pre-calculated features for the TM_PRED and/or the DC_PRED intra-prediction modes.

A third pre-calculated feature can be the mean of the current block. More specifically, the mean of the pixel values of the current block. A fourth pre-calculated feature can be the variance of current block. That is, the variance can be the variance of the pixel values of the current block.

Additional pre-calculated features can be obtained by convolving the current block with one or more filters. For each filter, a convolution block is obtained. An additional pre-calculated feature can be scalar value that is derived from the convolution block. In an example, the scalar value can be a sum-of-absolute values of the values of the convolution block. An example of obtaining a sum-of-absolute values of the values of a convolution block is described with respect to FIG. 13.

Figure 13:
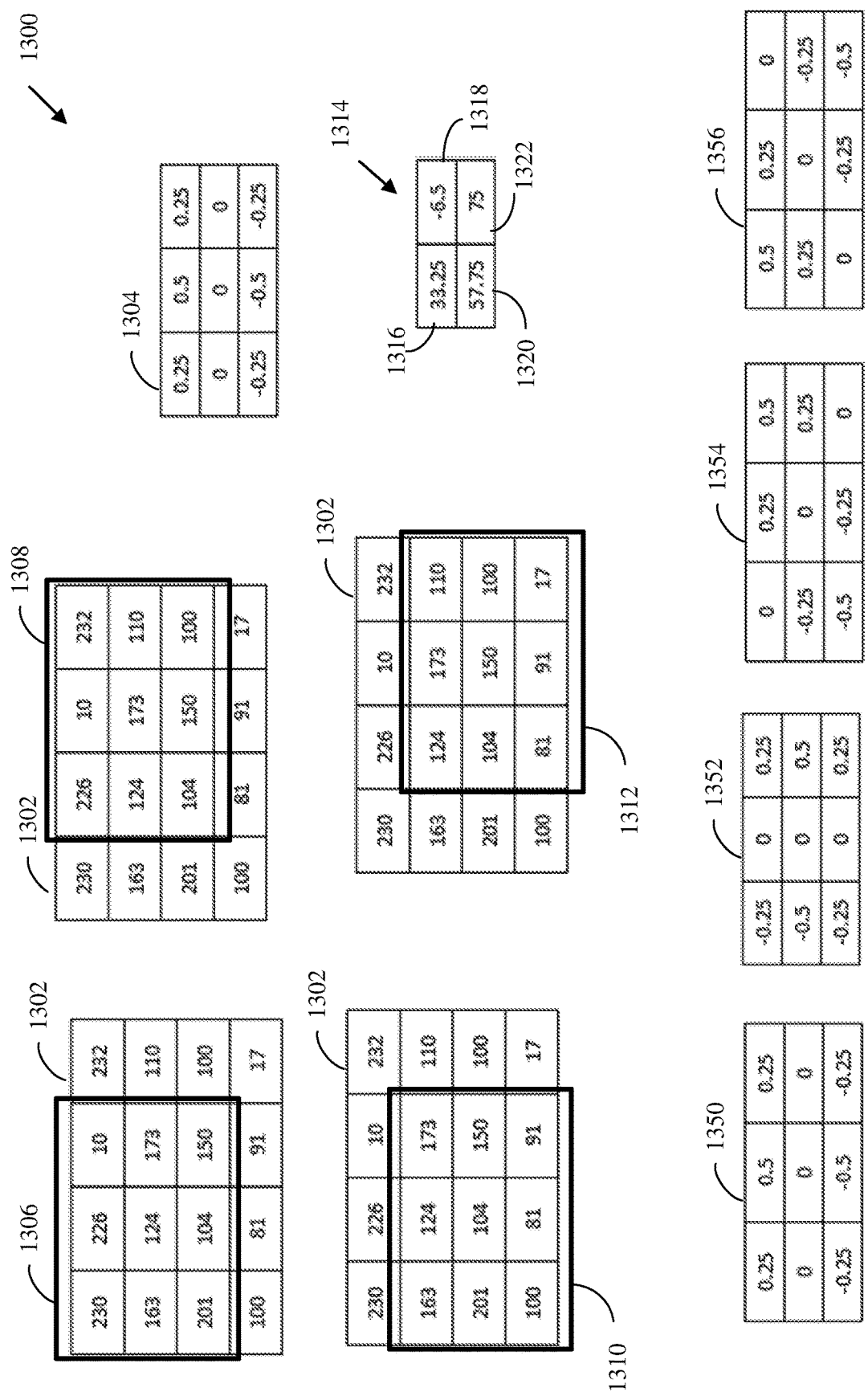
FIG. 13 is an example of obtaining a sum-of-absolute values of a convolution block according to implementations of this disclosure.

FIG. 13 is an example of obtaining a sum-of-absolute values of a convolution block according to implementations of this disclosure. The example 1300 includes a region 1302 of an image block (i.e., a current block). The region 1302 is shown as a 4×4 region for the purposes of this example. However, it is to be understood that convolution filters can be applied to any size block, superblock, region of image, or an image.

A filter 1304 of size 3×3 is used in this example. However, filters can have different sizes. The example 1300 uses an overlapping convolution operation with a stride of one. However, the stride can be greater than one. For example, non-overlapping convolution operations with a stride that is equal to the filter size can be used. As such, the stride size, in each of the horizontal and vertical directions can be 3.

Convolution block 1314 is the output of convolving the filter 1304 with the region 1302.

The filter 1304 is first convolved (e.g., using a matrix multiplication operation) with a sub-region 1306. As such, a value 1316 of the convolution block 1314 can be calculated as (230×0.25+226×0.5+10×0.25+163×0+124×0+173×0+201×(−0.25)+104×(−0.5)+150×(−0.25))=33.25. The filter 1304 is then convolved with a sub-region 1308. As such, a value 1318 can be calculated as (226×0.25+10×0.5+232×0.25+124×0+173×0+110×0+104×(−0.25)+150×(−0.5)+100×(−0.25))=−6.5. The filter 1304 is then convolved with a sub-region 1310. As such, a value 1320 can be calculated as (163×0.25+124×0.5+173×0.25+201×0+104×0+150×0+100×(−0.25)+81×(−0.5)+91×(−0.25))=57.75. The filter 1304 is then convolved with a sub-region 1312. As such, a value 1322 can be calculated as (124×0.25+173×0.5+110×0.25+104×0+150×0+100×0+81×(−0.25)+91×(−0.5)+17×(−0.25))=75.

The sum-of-absolute values is then calculated as |33.25|+|−6.5|+|57.75|+|75|=172.5.

Returning to FIG. 12. The filters (which may also be referred to as kernels) can be selected so as to measure overall edge directions in the current block. In an example, filters can be selected so as to measure overall edge directions along the main directions of the available intra-prediction modes.

The main directions can correspond to the most common modes selected by the brute-force approach. For example, in VP9, the most common modes are those associated with the horizontal direction (i.e., the H_PRED intra-prediction mode), the vertical direction (i.e., the V_PRED intra-prediction mode), the 45-degree direction (i.e., the D45_PRED intra-prediction mode), and the 135-degree direction (i.e., the D135_PRED intra-prediction mode).

In an example, Sobel operators can be used. The Sobel operator performs a 2-D spatial gradient measurement on an image block. Thus, the Sobel operator can emphasize regions of high spatial frequency corresponding to edges with the corresponding directions in the image block.

Any number of filters can be used. In an example, four filters can be used. As such, four convolution blocks can be obtained and four corresponding scalar values. In an example, each scalar value can be the sum of absolute values of all values in the corresponding convolution block. The four filters used for detecting strong edge responses in the horizontal, vertical, 135-degree, and 45-degree directions are given, respectively, by filters 1350 (which is the same as the filter 1304), 1352, 1354, and 1356 of FIG. 13.

To reiterate, for each filter (e.g., Sobel filter), the filter is convolved with a current block (e.g., a N×N block) to generate an M×M convolution block. The value of M can be different with different value of the stride and convolution mode. Each direction can be calculated as the sum of the absolute value of all the pixels in the convolution image.

The use of pre-calculated features such as those described above (e.g., mean and variance of the pixel values of the current block, filter- (e.g., Sobel-filter-) based directional features, and SAD-based heuristics costs can provide effective description of the current block and contain vital information that can lead to the right choice of an intra-prediction mode for the current block. Additionally, such pre-calculated features can effectively replace the need for large feature extraction layers in conventional models, thus significantly reducing ML model complexity and size.

In another example, instead of using pre-selected kernel weights (e.g., the filters 1350-1356), kernel (filter) weights can be learned using a set of convolutional operations. In an example, the kernel weights can be learned during an off-line training using a convolutional network. The learned kernels can be used in place of the filters 1350-1356 to obtain respective convolutional blocks. In another example, the convolutional operations can be part of the ML model, as shown in FIG. 12B.

FIG. 12B is a diagram of an example 1250 of a network structure according to implementations of this disclosure. The example 1250 is similar the example 1200 with the exception that the example 1250 includes a set of convolutional layers 1252 for generating the filter weights. The filter weights that are output from the convolutional layers 1252 can be used to obtain respective convolutional blocks. For each of respective convolutional blocks, a sum-of-absolute values is calculated. The sums-of-absolute values of the respective convolutional blocks are then used as part of the inputs of the input layer 1202. As such, the values (i.e., weights) of a filter can be determined, by the machine-learning model, during the training phase of the machine-learning model, such as at 1102 of FIG. 11. The input to the set of convolutional layers 1252 can be the raw pixel values of the image block.

To reiterate, during the training phase (i.e., at 1102), the ML model learns (e.g., trains, builds, derives, etc.) a mapping (i.e., a function) that accepts, as input, a block and pre-calculated features and outputs an ML intra-prediction mode.

During the training phase, and so that the learned function can be as useful as possible, it is preferable that the ML model be trained using a large range of input blocks and a large range of possible QP values, such as QP values that are used in representative of real-world applications.

As mentioned above, the ML model that is trained is a small model, which can accommodate (e.g., to be used on/by) resource-constrained devices. With a trade-off between model complexity and prediction accuracy, a much smaller ML model usually means accuracy degradation.

To compensate for the degraded accuracy, some implementations according to this disclosure can merge (e.g., fuse, supplement, etc.) the ML decision (i.e., the ML intra-prediction mode) with the encoder's heuristic-based selection (i.e., a most-probable intra-prediction mode) adaptively according to the prediction quality of the ML model.

In an example, the most-probable intra-prediction mode can be the SAD-based mode decision. The SAD-based decision can be the intra-prediction mode that has the minimum SAD cost, as described above. In another example, the encoder can select a most-probable intra-prediction mode in some other way. For example, the most-probable intra-prediction mode for a current block can be selected based on the intra-prediction modes of one or more of the current block's neighboring blocks (e.g., a left neighboring block and an above neighboring block).

The merging (i.e., fusing) strategy is now described.

Let x denote the most-probable intra-prediction mode. Let m denote the ML intra-prediction mode. That is, m is the intra-prediction mode that is predicted by the ML model. Let y be the ground truth intra-prediction mode decision. That is, y denotes the intra-prediction mode that is selected by the encoder using the brute-force approach for encoding the current block.

During the training phase, two probabilities are calculated according to equations (1) and (2).

$$Px[i]=p(y=i|x=i,m\neq i) \quad (1)$$

$$Pm[i]=p(y=i|x\neq i,m=i) \quad (2)$$

In equation (1), the ground truth is mode i, x and m are different predicted modes, and Px[i] is the probability of x being the correct mode. That is, the ML intra-prediction mode (i.e., the intra-prediction mode that is inferred by the ML mode) is not equal to the brute-force selected intra-prediction mode; however, the heuristic (i.e., the most-probable) mode is equal to the brute-force selected intra-prediction mode.

In equation (2), the ground truth is mode i, x and m are different predicted modes, and Pm[i] is the probability of m being the correct mode. That is, the ML intra-prediction mode (i.e., the intra-prediction mode that is inferred by the ML mode) is equal to the brute-force selected intra-prediction mode; however, the heuristic (i.e., the most-probable) mode is not equal to the brute-force selected intra-prediction mode.

Based on the Px[i] and Pm[i] probabilities that are accumulated during the training over all of the test data, a decision matrix can also be generated. If an encoder includes N available intra-prediction modes, then the decision matrix can be an N×N matrix. For example, if there are 10 available intra prediction modes (such as in VP9), then the decision matrix can be a 10×10 matrix.

In an example, the entries of the decision matrix, A, can be set as shown in equation (3).

$$A[i][j] = \begin{cases} 1 & \text{if } Px[i] < pm[j] \\ 0 & \text{otherwise} \end{cases} \quad (3)$$

During inference, and in an example, the decision matrix can be used as follows: If the most-probable intra-prediction mode (e.g., the SAD-based mode) is predicted to be the mode i, and the ML model predicts the mode to be j, the relative reliabilities of the ML model prediction and model-probable mode prediction are evaluated. The most reliable prediction is selected. Again, the relative reliabilities are the values of the decision matrix, which is generated during the training. The power of the adaptive decision fusion strategy described herein can significantly boost the performance of a small model.

In an example, during inference, if the ML-predicted mode (i.e., the ML intra-prediction mode) is chosen (i.e., is selected because it is more reliable than the most-probable mode), and the ML intra-prediction mode is different from the most-probable intra-prediction mode (e.g., the SAD-based mode), the cost associated with the ML intra-prediction mode can be set to a value that is smaller than the cost associated with the most-probable intra-prediction mode. As is known, the mode cost can be used in the encoder for deciding, for example, the optimal partition, prediction mode, and/or transform sizes. In an example, the cost associated with the ML intra-prediction mode can be reduced by a certain percentage (e.g., 10%, 25%, or some other percentage).

FIG. 14 illustrates examples of decision matrices according to implementations of this disclosure. A first decision matrix 1402 is generated during training of a first ML model that is as described with respect to FIG. 12A. The first ML model includes one hidden layer containing 10 nodes. The first ML model size is 300 parameters. A second decision matrix 1404 is also generated during training of a second ML model that is also as described with respect to FIG. 12A. The second ML model includes one hidden layer containing 50 nodes. The second ML model size is 1600 parameters.

The first ML model and the second ML model are trained using the same input data. The first ML model and the second ML model are trained for use with the VP9 decoder. As such, i and j of the first decision matrix 1402 and the second decision matrix 1404 have values from 0 to 9 corresponding, respectively to the available intra-prediction modes DC_PRED, V_PRED, H_PRED, D45_PRED, D135_PRED, D117_PRED, D153_PRED, D207_PRED, D63_PRED, and TM_PRED.

In comparing the first decision matrix 1402 and the second decision matrix 1404, it can be observed that for the larger model (i.e., the second ML model), because its prediction accuracy is high, the decision matrix (i.e., the second decision matrix 1404) almost always chooses the ML decision instead of the most-probable intra-prediction decision; and less so for the smaller model (i.e., the first ML model). This comparison illustrates the importance of using the fusion strategy for a small model. When the ML model is big enough, such fusion is not as important and may not be necessary because the ML model decision is always preferred to the most-probable mode decision. However, for a smaller ML model, the lower-quality ML decisions can be modified with (e.g., supplemented by, fused with, etc.) most-probable intra-prediction mode decisions.

The ML model can then be used by the process 1100 during an inference phase. The inference phase includes the operations 1104 and 1106. A separation 1110 indicates that the training phase and the inference phase can be separated in time. As such, the inferencing phase can be performed by a first encoder and the training data 1112 can be generated by a second encoder. In an example, the first encoder and the second encoder are the same encoder. That is, the training data 1112 can be generated by the same encoder that performs the inference phase. In either case, the inference phase uses a machine-learning model that is trained as described with respect to 1102. As mentioned above, in some examples, the decision matrix can also be used during the inference phase.

At 1104, inputs are presented to the ML module. That is, the inputs are presented to a module that incorporates, includes, executes, implements, and the like the ML model. The ML module can be a hardware-implemented module. The ML module can be stored in a memory as executable instructions, which can be executed by a processor.

The inputs can include the image block and pre-calculated features, as described above with respect to the training phase of the ML model.

At 1106, the process 1100 obtains an encoding intra-prediction mode. The encoding intra-prediction mode is to be used for encoding the image block (i.e., the current block).

In an example, an encoding intra-prediction mode can be obtained from the ML model. That is, the ML intra-prediction mode (i.e., the output of the ML model) can be the encoding intra-prediction mode. In another example, and as described above, the process 1100 can also use a decision matrix at 1104. That is, the process 1100 selects between a most-probable intra-prediction mode and the ML intra-prediction mode based on the decision matrix.

At 1108, the process 1100 encodes the image block using the encoding intra-prediction mode. That is, for example, and described with respect to the intra/inter-prediction stage 402 of FIG. 4, a prediction block can be obtained using the encoding intra-prediction mode, a residual block can then be obtained and, consistent with the description of FIG. 4, ultimately entropy encode, as described with respect to the entropy encoding stage 408, the residual block in a compressed bitstream, such as the bitstream 420 of FIG. 4.

FIG. 15 is a flowchart of a process 1500 for encoding a current block using intra-prediction according to implementations of this disclosure and consistent with the above description. The process 1500 can be executed (i.e., performed) by an encoder after a determination by the encoder that an intra-prediction mode is to be selected for the current block. The process 1500 uses a machine learning (ML) model and a decision matrix to select (e.g., obtain, determine, infer, etc.) an intra-prediction mode for encoding the current block. The current block can be a block of an image (e.g., frame) of a video stream. The current block can be a luminance block, such as the luminance block 660 of FIG. 6. The current block can be a chrominance block, such as the U or Cb chrominance block 670 or the V or Cr chrominance block 680 of FIG. 6. The current block can be a superblock, a macroblock, any largest coding unit sized block, or a sub-block thereof. For example, the image can be a 128×128 luminance block, a 64×64 chrominance block, a 4×4 luminance block, or some other sized block. The current block can be any block that can be prediction using intra-prediction by the encoder performing the process 1500.

The process 1500 can be implemented, for example, as a software program that may be executed by computing devices such as the transmitting station 102. For example, the software program can include machine-readable instructions that may be stored in a memory such as the memory 204 or the secondary storage 214, and that, when executed by a processor, such as the CPU 202, may cause the computing device to perform the process 1500. The process 1500 can be implemented using specialized hardware or firmware. For example, a hardware component can be configured to perform the process 1500. As explained above, some computing devices may have multiple memories or processors, and the operations described in the process 1500 can be distributed using multiple processors, memories, or both. In an example, the process 1500 can be executed as part of an intra/inter-prediction stage, such as the intra/inter-prediction stage 402 of FIG. 4.

At 1502, the process 1500 obtains, using a machine-learning (ML) model, an ML intra-prediction mode. The ML model can be a model that is trained as explained above with respect to FIG. 11. As such, in an example, the ML model can be trained using input data to output the ML intra-prediction mode for the current block. As also described above, an input datum of the input data can include an input block of video and a corresponding ground-truth intra-prediction mode for encoding the input block of video. The ground-truth intra-prediction mode being the intra-prediction mode selected by an encoder using a brute-force approach to mode prediction.

As explained above, pre-calculated features can be input to the ML model. As such, in an example, the process 1500 can calculate at least one of a mean and a variance of the pixel values of the current block. The at least one of the mean or the variance can be used as input to the ML model.

In an example, the pre-calculated features can include one or more directional-based features. Each of the directional-based features can be obtained applying a respective kernel to the current block to obtain a convolution block, obtaining a scalar from the convolution block, and using the scalar as an input to the ML model. In an example, the scalar can be the sum-of-absolute values of the convolution block. As also mentioned above, in an example, the filter can be a Sobel filter corresponding to a direction associated with an available intra-prediction mode. The available intra-prediction mode is one of the possible intra-prediction modes that the encoder can use to intra-predict a block. As also, mentioned above, in an example, the filter weights are not fixed. Rather, in an example, the filter weights can be learned during the training phase of the ML model. As such, the convolution block can be obtained by using the current block as an input to one or more convolution layers.

As also mentioned above, in an example, a non-linear function of a quantization parameter can be used as a pre-calculated feature input to the ML model. The quantization parameter (i.e., the value of the quantization parameter) can be selected by the encoder.

As also mentioned above, in an example, pre-calculated costs associated with at least a subset of the available intra-prediction modes can be used as inputs to the ML model. In a typical video encoder, such pre-calculated costs are usually already available in the encoder, therefore such pre-calculated costs can be directly used as the ML input. That is, the process 1500 can calculate the costs associated with the at least a subset of the available intra-prediction modes and can feed the costs, as inputs, to the ML model. As such, the process 1500 can calculate, for at some modes of the available intra-prediction modes, respective prediction blocks; calculate respective errors between the respective prediction blocks and the current block; and use the respective errors as inputs to the ML model.

At 1504, the process 1500 obtains a most-probable intra-prediction mode from amongst available intra-prediction modes for encoding the current block. In an example, the most-probable intra-prediction mode can be selected by the encoder based on the intra-prediction modes of neighboring blocks. In an example, the most-probable intra-prediction mode can be the intra-prediction mode corresponding to the smallest cost of the pre-calculated costs described above. That is, the most-probable intra-prediction mode can be the SAD-based intra-prediction mode. As such, whether or not the pre-calculated costs are used as inputs to the ML mode, the process 1500 can use the pre-calculated costs to select the most-probable intra-prediction mode.

At 1506, the process 1500 selects, as an encoding intra-prediction mode, one of the ML intra-prediction mode or the most-probable intra-prediction mode. The process 1500 selects the encoding intra-prediction mode based on relative reliabilities of the ML intra-prediction mode and the most-probable intra-prediction mode.

The one of the ML intra-prediction mode or the most-probable intra-prediction mode is more reliable than the other of the one of the ML intra-prediction mode or the most-probable intra-prediction mode in case where the one of the ML intra-prediction mode or the most-probable intra-prediction mode is a better predictor of an optimal intra-prediction mode. The optimal intra-prediction mode is mode that would be selected by encoder that performs a best mode search. In an example, the best model can be as described with respect to FIG. 8 above.

In an example, the process 1500 uses a decision matrix to select the encoding intra-prediction mode. In an example, and as described above, the decision matrix can be generated during the training phase of the ML model using statistics that compare respective performances of the ML model and an encoder selecting the most-probable intra-prediction modes as compared to ground-truth intra prediction modes. The decision matrix indicates whether the ML intra-prediction mode or the most-probable intra-prediction mode is to be selected as the encoding intra-prediction mode.

In an example, and in the case that the ML intra-prediction mode is selected, and as described above, the process 1500 can reduce the cost associated with the ML intra-prediction mode. As such, the selecting the ML intra-prediction mode can include calculating a first cost associated with the ML intra-prediction mode and reducing the first cost to a second cost. In an example, calculating the first cost may already have been done as part of the pre-calculated costs.

At 1508, the process 1500 encodes the encoding intra-prediction mode in a compressed bitstream. The compressed bitstream can be the compressed bitstream 420 of FIG. 4.

At 1510, the process 1500 encodes the current block using the encoding intra-prediction mode. For example, the process 1500 can perform one or more of the following: generate a prediction block, generate a prediction block, generate a residual block, transform the residual block to obtain a transform block, quantize and encode the transform block in the compressed bitstream, as described above with respect to FIG. 4. When decoding the current block, a decoder can use (i.e., decode) the encoding intra-prediction mode, which the decoder can use to reconstruct the current block, as described above with respect to FIG. 5.

In an example, an encoder can use the top N (>1) prediction modes to estimate and compare their final bit rates. As such, in an example, the ML model described herein can be used to derive (e.g., output, infer, etc.) the N-most-probable modes according to their respective prediction values. These N top modes can then be combined (e.g., fused, as described herein) with the SAD-derived top N modes to obtain a final list of top N modes. One of the N modes can then be selected, based, for example, on their respective costs for encoding a current block.

As such, in an implementation, N ML intra-prediction modes can be obtained using an ML model; N most probable intra-prediction modes (e.g., SAD-based most probable intra-prediction modes) can be obtained from among the available intra-prediction modes; one of the N ML intra-prediction modes or one of the N most-probable intra-prediction modes can be selected as the encoding intra-prediction mode; the encoding intra-prediction mode can be encoded in a compressed bitstream; and the current block can then be encoded using the encoding intra-prediction mode.

Figure 16:
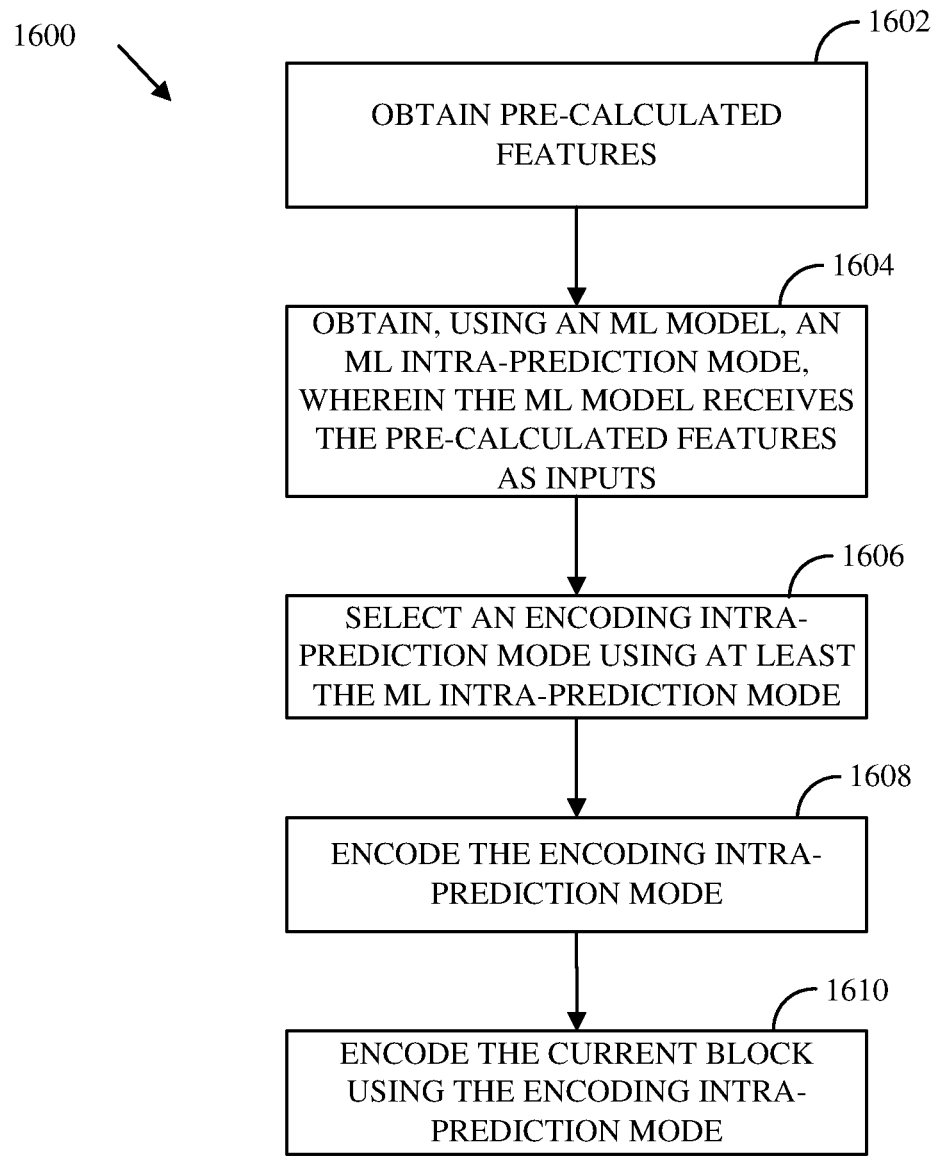
FIG. 16 is a flowchart of a process for encoding a current block using intra-prediction according to implementations of this disclosure.

FIG. 16 is a flowchart of a process 1600 for encoding a current block using intra-prediction according to implementations of this disclosure and consistent with the above description. The process 1600 can be executed (i.e., performed) by an encoder subsequent to a determination by the encoder that an intra-prediction mode is to be selected for the current block. The process 1600 uses a machine learning (ML) model and a decision matrix to select (e.g., obtain, determine, infer, etc.) an intra-prediction mode for encoding the current block. The current block can be a block of an image (e.g., frame) of a video stream. The current block can be a luminance block, such as the luminance block 660 of FIG. 6. The current block can be a chrominance block, such as the U or Cb chrominance block 670 or the V or Cr chrominance block 680 of FIG. 6. The current block can be a superblock, a macroblock, any largest coding unit sized block, or a sub-block thereof. For example, the image can be a 128×128 luminance block, a 64×64 chrominance block, a 4×4 luminance block, or some other sized block. The current block can be any block that is capable of being intra-predicted by the encoder performing the process 1600.

The process 1600 can be implemented, for example, as a software program that may be executed by computing devices such as the transmitting station 102. For example, the software program can include machine-readable instructions that may be stored in a memory such as the memory 204 or the secondary storage 214, and that, when executed by a processor, such as the CPU 202, may cause the computing device to perform the process 1600. The process 1600 can be implemented using specialized hardware or firmware. For example, a hardware component can be configured to perform the process 1600. As explained above, some computing devices may have multiple memories or processors, and the operations described in the process 1600 can be distributed using multiple processors, memories, or both. In an example, the process 1600 can be executed as part of an intra/inter-prediction stage, such as the intra/inter-prediction stage 402 of FIG. 4.

At 1602, the process 1600 obtains pre-calculated features. Obtaining the pre-calculated features can mean calculating, selecting, determining, or in any way obtaining. The pre-calculated features can include two or more of: a first feature that is a non-linear function of a quantization parameter; second features that are respective errors between the current block and respective prediction blocks, wherein each prediction block corresponds to an available intra-prediction mode; a mean and a variance of the current block; and a sum-of-absolute values of a convolution block that is obtained from the current block. Each of the pre-calculated features can be as described above.

In an example, the sum-of-absolute values of the convolution image are obtained from the current block by applying a Sobel filter to the current block to obtain the convolution block. In an example, the sum-of-absolute values of the convolution image are obtained from the current block by steps including obtaining the convolution block using convolutional operations.

In an example, the pre-calculated features can include all of the first feature, the second features, the mean and the variance, and the sum-of-absolute values of the convolution block.

At 1604, the process 1600 obtains, using a machine-learning (ML) model, an ML intra-prediction mode. The ML model can receive the pre-calculated features as inputs. The ML model can be trained, in a training phase, using input data to output the ML intra-prediction mode for the current block. Each input datum of the input data (i.e., the training data) can include an input block of video and a corresponding ground-truth intra-prediction mode for encoding the input block of video. The input datum can also include a corresponding QP value that is used for encoding the input block of video using the ground-truth intra-prediction mode. As described above, a non-linear function of the QP value can be used in the input datum.

At 1606, the process 1600 selects an encoding intra-prediction mode using at least the ML intra-prediction mode. In an example, the ML intra-prediction mode that is output by the ML model can be the encoding intra-prediction mode, which is used to encode the current block.

In an example, selecting the encoding intra-prediction mode using at least the ML intra-prediction mode can include obtaining a most-probable intra-prediction mode from amongst available intra-prediction modes for encoding the current block; and using a decision matrix to select the encoding intra-prediction mode. The encoding intra-prediction mode can be one of the ML intra-prediction mode or the most-probable intra-prediction mode. The most-probable intra-prediction mode can be as described above. In an example, the decision matrix can be generated during the training phase using statistics that compare respective performances of the ML model and an encoder selecting most-probable intra-prediction modes as compared to ground-truth intra prediction modes. The decision matrix indicates whether the ML intra-prediction mode or the most-probable intra-prediction mode is to be selected as the encoding intra-prediction mode.

At 1608, the process 1600 encodes the encoding intra-prediction mode in a compressed bitstream. The compressed bitstream can be the compressed bitstream 420 of FIG. 4. At 1610, the process 1600 encodes the current block using the encoding intra-prediction mode. For example, the process 1600 can perform one or more of the following: generate a prediction block, generate a prediction block, generate a residual block, transform the residual block to obtain a transform block, quantize and encode the transform block in the compressed bitstream, as described above with respect to FIG. 4. When decoding the current block, a decoder can use (i.e., decode) the encoding intra-prediction mode, which the decoder can use to reconstruct the current block, as described above with respect to FIG. 5.

Figure 17:
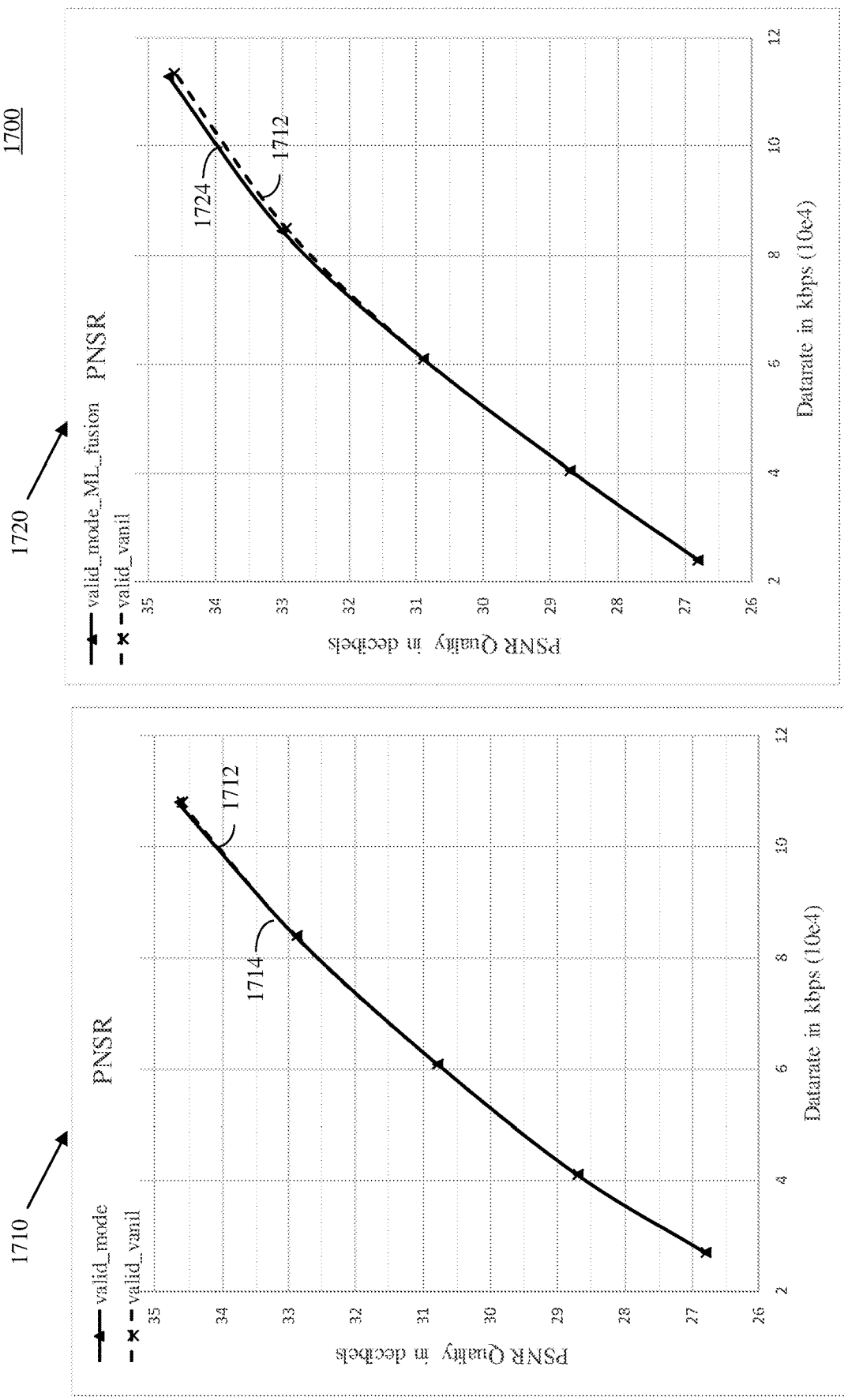
FIG. 17 is an example 1700 of a rate-distortion performance comparison.

FIG. 17 is an example 1700 of a rate-distortion performance comparison. The example 1700 illustrates the results of an experiment with diversified genres to verify the effectiveness of the implementations according to this disclosure. The rate-distortion performance resulting from using an ML model to infer prediction modes to be used in a VP9 hardware encoder for keyframe-only encoding (denoted as valid_mode 1712) is compared to that resulting from using the most-probable intra-prediction mode (denoted as valid_vanil 1714). The ML model includes only 1600 parameters. The small model size makes it possible to perform inferring on a power- and/or capacity constrained platform (such as a mobile device).

In the experiment, the peak signal-to-noise ratio (PSNR) is used as the distortion metric. PSNR is used as the distortion metric. That is, in graphs 1710 and 1720, the x-axis indicates the data rate for encoding the sample video sequence measured in kbps, while the y-axis indicates PSNR quality measured in decibels (dB).

The graph 1710 illustrates that a consistent performance enhancement is achieved. On average, a higher rate-distortion performance can be achieved when using ML predictions to completely replace SAD-based approach (e.g., the most-probable intra-prediction mode). The performance in the Bjøntegaard rate difference (BD-rate) is about 0.9% better than the SAD-based approach.

The graph 1720 shows the rate-distortion performance when merging ML decisions and SAD-based decisions according to the adaptive fusion strategy described above. When combining the two decisions, on average, the performance in BD-rate (i.e., a curve 1724) is about 1.2% better than SAD-based approach (e.g., a curve 1712), and 0.3% better than ML-only approach. This shows the effectiveness of adaptively combining ML decisions and SAD-based decisions according to the ML prediction quality.

The ML model used has only 1600 parameters. The small model size makes it possible to perform inferring on a power/capacity-constrained mobile platform.

As described above with respect to 1108 of FIG. 11, 1508 of FIG. 15, or 1608 of FIG. 16, an encoder that uses a machine-learning model, such as the ML model described with respect to FIG. 12A or the ML model described with respect to FIG. 12B, to infer mode decision parameters for image block, can encode the mode decision parameters (i.e., an encoding intra-prediction mode), in a compressed bitstream, such as the bitstream 420 of FIG. 4.

As such, a decoder, such as the decoder 500 of FIG. 5, can decode the image block using the mode decisions parameters received in the compressed bitstream.

As such, a process of decoding an image block can include receiving, in a compressed bitstream, such as the compressed bitstream 420 of FIG. 5, an encoding intra-prediction mode (e.g., an encoded index or symbol indicative of the encoding intra-prediction mode); and decoding the image block using the encoding intra-prediction mode.

As mentioned above, a ML model that is configured as described above can be used by an encoder, such as the encoder 400 of FIG. 4, to infer an intra-prediction mode. As such, the intra-prediction mode is not derived by brute force methods as are known in the art. In an example, the ML model can be used by the intra/inter-prediction stage 402.

For simplicity of explanation, the processes 800, 1100, 1500, and 1600 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The aspects of encoding and decoding described above illustrate some encoding and decoding techniques. However, it is to be understood that "encoding" and "decoding," as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as being preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise or clearly indicated otherwise by the context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor, which can contain other hardware for carrying out any of the methods, algorithms, or instructions described herein, can be utilized.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other transmitting station 102 and receiving station 106 implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described to allow easy understanding of the present disclosure and do not limit the present disclosure. On the contrary, the disclosure is intended to cover various modifications and equivalent arrangements included within the scope of the appended claims, which scope is to be accorded the broadest interpretation as is permitted under the law to encompass all such modifications and equivalent arrangements.

What is claimed is:

1. A method for encoding a current block of video using intra-prediction, comprising:
   obtaining, using a machine-learning (ML) model, an ML intra-prediction mode;
   obtaining a most-probable intra-prediction mode from amongst available intra-prediction modes for encoding the current block;
   selecting, as an encoding intra-prediction mode, one of the ML intra-prediction mode or the most-probable intra-prediction mode, wherein the selecting is based on relative reliabilities of the ML intra-prediction mode and the most-probable intra-prediction mode, wherein the relative reliabilities are values of a decision matrix generated during training of the ML model;
   encoding, in a compressed bitstream, the encoding intra-prediction mode; and
   encoding the current block using the encoding intra-prediction mode.

2. The method of claim 1, wherein the one of the ML intra-prediction mode or the most-probable intra-prediction mode is more reliable than the other of the one of the ML intra-prediction mode or the most-probable intra-prediction mode in case where the one of the ML intra-prediction mode or the most-probable intra-prediction mode provides the best rate-distortion performance.

3. The method of claim 1, wherein, in a training phase, the ML model is trained using input data to output the ML intra-prediction mode for the current block, and an input datum of the input data comprises an input block of video and a corresponding ground-truth intra-prediction mode for encoding the input block of video.

4. The method of claim 3, wherein selecting, as the encoding intra-prediction mode, one of the ML intra-prediction mode or the most-probable intra-prediction mode comprises:
   using the decision matrix to select the encoding intra-prediction mode, wherein:
      the decision matrix is generated during the training phase using statistics that compare respective performances of the ML model and an encoder selecting most-probable intra-prediction modes as compared to ground-truth intra prediction modes, and
      the decision matrix indicating whether the ML intra-prediction mode or the most-probable intra-prediction mode is to be selected as the encoding intra-prediction mode.

5. The method of claim 1, wherein obtaining, using the ML model, the ML intra-prediction mode comprises:
   using at least one of a mean of the current block or a variance of the current block as input to the ML model.

6. The method of claim 1, wherein obtaining, using the ML model, the ML intra-prediction mode comprises:
   applying a kernel to the current block to obtain a convolution block;
   obtaining a scalar from the convolution block; and
   using the scalar as an input to the ML model.

7. The method of claim 6, wherein the kernel is a Sobel filter corresponding to a direction associated with an available intra-prediction mode of the available intra-prediction modes, and the scalar is a sum of absolute values of the convolution block resulting from applying the Sobel filter.

8. The method of claim 6, wherein the kernel is applied to the current block using one or more convolution layers that are trained during a training phase.

9. The method of claim 1, wherein obtaining, using the ML model, the ML intra-prediction mode comprises using a non-linear function of a quantization parameter as an input to the ML model.

10. The method of claim 1, wherein obtaining, using the ML model, the ML intra-prediction mode comprises:
calculating, for multiple modes of the available intra-prediction modes, respective prediction blocks;
calculating respective errors between the respective prediction blocks and the current block; and
using the respective errors as inputs to the ML model.

11. The method of claim 1, wherein selecting, as the encoding intra-prediction mode, one of the ML intra-prediction mode or the most-probable intra-prediction mode comprises:
calculating a first cost associated with the ML intra-prediction mode;
selecting the ML intra-prediction mode as the encoding intra-prediction mode; and
reducing the first cost to a second cost.

12. A method for encoding a current block of video using intra-prediction, comprising:
obtaining pre-calculated features, wherein the pre-calculated features comprise at least three of:
a non-linear function of a quantization parameter;
respective errors between the current block and respective prediction blocks, wherein each prediction block corresponds to an available intra-prediction mode;
a mean of the current block;
a variance of the current block; or
a sum-of-absolute values of a convolution block, the convolution block obtained from the current block;
obtaining, using a machine-learning (ML) model, an ML intra-prediction mode, wherein the ML model receives the pre-calculated features as inputs;
selecting an encoding intra-prediction mode using at least the ML intra-prediction mode, wherein selecting the encoding intra-prediction mode using at least the ML intra-prediction mode comprises:
obtaining a most-probable intra-prediction mode from amongst available intra-prediction modes for encoding the current block; and
using a decision matrix to select the encoding intra-prediction mode, wherein the encoding intra-prediction mode is one of the ML intra-prediction mode or the most-probable intra-prediction mode;
encoding, in a compressed bitstream, the encoding intra-prediction mode; and
encoding the current block using the encoding intra-prediction mode.

13. The method of claim 12, wherein the pre-calculated features comprise the non-linear function of the quantization parameter, the respective errors between the current block and respective prediction blocks, the mean of the current block, the variance of the current block, and the sum-of absolute values of the convolution block.

14. The method of claim 12, wherein:
the decision matrix is generated during a training phase using statistics that compare respective performances of the ML model and an encoder selecting most-probable intra-prediction modes as compared to ground-truth intra prediction modes, and
the decision matrix indicating whether the ML intra-prediction mode or the most-probable intra-prediction mode is to be selected as the encoding intra-prediction mode.

15. The method of claim 12, wherein, in a training phase, the ML model is trained using input data to output the ML intra-prediction mode for the current block, wherein an input datum of the input data comprises an input block of video and a best intra-prediction mode for encoding the input block of video.

16. The method of claim 12, wherein calculating the sum-of-absolute values of the convolution block obtained from the current block comprises applying a Sobel filter to the current block to obtain the convolution block.

17. The method of claim 12, wherein calculating the sum-of-absolute values of the convolution block obtained from the current block comprises obtaining the convolution block using convolutional operations.

18. An apparatus for encoding a current block of video using intra-prediction, wherein the apparatus:
obtains, using a machine-learning (ML) model, ML intra-prediction modes;
obtains most-probable intra-prediction modes from amongst available intra-prediction modes for encoding the current block;
selects, as an encoding intra-prediction mode, one of the ML intra-prediction modes or one of the most-probable intra-prediction modes, wherein the selecting is based on relative reliabilities of the ML intra-prediction mode and the most-probable intra-prediction mode, wherein the relative reliabilities are values of a decision matrix generated during training of the ML model;
encodes, in a compressed bitstream, the encoding intra-prediction mode; and
encodes the current block using the encoding intra-prediction mode.

19. The apparatus of claim 18, wherein:
the apparatus selects, as the encoding intra-prediction mode, one of the ML intra-prediction modes or one of the most-probable intra-prediction mode using a decision matrix,
the decision matrix is generated during a training phase of the ML model using statistics that compare respective performances of the ML model and an encoder selecting most-probable intra-prediction modes as compared to ground-truth intra prediction modes, and
the decision matrix indicates whether an ML intra-prediction mode or a most-probable intra-prediction mode is to be selected as the encoding intra-prediction mode.

* * * * *